(12) United States Patent
Lee et al.

(10) Patent No.: US 10,605,604 B2
(45) Date of Patent: Mar. 31, 2020

(54) METHOD AND APPARATUS FOR CALCULATING ROTATION ANGLE OF DEVICE

(71) Applicant: Samsung Electronics Co., Ltd., Suwon-si (KR)

(72) Inventors: Han-sung Lee, Seoul (KR); Nam-hoon Kim, Suwon-si (KR); Jae-myeon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 456 days.

(21) Appl. No.: 14/965,261

(22) Filed: Dec. 10, 2015

(65) Prior Publication Data

US 2016/0169680 A1    Jun. 16, 2016

(30) Foreign Application Priority Data

Dec. 10, 2014  (KR) .......................... 10-2014-0177136

(51) Int. Cl.
*G01C 21/16*  (2006.01)
*G01C 21/20*  (2006.01)
*G01C 9/00*   (2006.01)
*G06F 3/0346* (2013.01)
*G01C 22/00*  (2006.01)

(52) U.S. Cl.
CPC ............ *G01C 21/16* (2013.01); *G01C 21/20* (2013.01); *G01C 9/00* (2013.01); *G01C 22/006* (2013.01); *G06F 3/0346* (2013.01)

(58) Field of Classification Search
USPC ........................................... 702/151
See application file for complete search history.

(56) References Cited

U.S. PATENT DOCUMENTS

| | | | | |
|---|---|---|---|---|
| 3,664,196 A | * | 5/1972 | Codina | G01P 15/132 310/90.5 |
| 7,529,640 B2 | * | 5/2009 | Fujiwara | G01C 9/00 702/127 |
| 2009/0216374 A1 | * | 8/2009 | Low | B25J 9/1689 700/258 |
| 2012/0041702 A1 | * | 2/2012 | Toda | G01C 21/16 702/94 |

(Continued)

FOREIGN PATENT DOCUMENTS

JP         4793223      10/2011

*Primary Examiner* — Paul D Lee
(74) *Attorney, Agent, or Firm* — Nixon & Vanderhye P.C.

(57) ABSTRACT

A device configured to determine a rotation angle with respect to a proceeding direction includes an accelerometer configured to obtain acceleration information related to movements of the device; a storage unit configured to store the acceleration information; and a controller configured to transform coordinates of the acceleration information, filter the acceleration information on the transformed coordinates, and determine the rotation angle of the device with respect to the proceeding direction of the device by using gravitational acceleration information on the transformed coordinates. The gravitational acceleration information is derived by using information about a time point when a vertical acceleration component at the transformed coordinates of the device has a maximum value, from among the acceleration information.

32 Claims, 25 Drawing Sheets

(56) References Cited

U.S. PATENT DOCUMENTS

| | | | | |
|---|---|---|---|---|
| 2013/0138390 A1* | 5/2013 | Shikatani | ............... | G01C 21/10 |
| | | | | 702/141 |
| 2014/0114604 A1* | 4/2014 | Zhang | ................... | A61B 5/1116 |
| | | | | 702/141 |
| 2015/0185002 A1* | 7/2015 | Yang | ...................... | G01B 21/22 |
| | | | | 702/151 |

* cited by examiner

Roll, Pitch, Yaw (Local Frame)

METHOD AND APPARATUS FOR CALCULATING ROTATION ANGLE OF DEVICE

RELATED APPLICATION(S)

This application claims the benefit of Korean Patent Application No. 10-2014-0177136, filed on Dec. 10, 2014, in the Korean Intellectual Property Office, the disclosure of which is incorporated herein in its entirety by reference.

BACKGROUND

The present disclosure relates to a method and apparatus for calculating a rotation angle of a device, and more particularly, to a method and apparatus for calculating an inclination angle of a device with respect to a moving direction of the device.

Pedestrian dead-reckoning (PDR) may be used for estimating a position by using devices such as smartphones. In PDR, an inclination angle of the device substantially affects position estimation performance. When the inclination angle of the device is miscalculated, an error may still be present even though a moving distance has been accurately calculated.

In particular, when a user of a small device such as a smartphone moves while gripping the device in his/her hand, an inclination angle of the device with respect to a moving direction of the device may change arbitrarily depending on user convenience or an intention of the user. For example, assuming that the user is moving while gripping the smartphone in a vertical direction (portrait mode) or a horizontal direction (landscape mode), when the user is moving while the smartphone is inclined in a yawing direction by about 60° with respect to a moving direction, it may be difficult to calculate an inclination angle of the smartphone with respect to the moving direction of the user by only using a built-in accelerometer of the smartphone. Due to inaccurate calculation, position calculation results may have many errors.

It is difficult to calculate the inclination angle of the device with respect to the moving direction of the device because an accelerometer in the device senses gravitational (gravity axis) acceleration, information about acceleration in a direction in which the user is moving, and vertical acceleration information, but cannot distinguish between the acceleration components.

According to the related art, an inclination angle of a device with respect to a moving direction of a user may be calculated by interpreting acceleration information, which is sensed by using an accelerometer, a gyroscope, and a geomagnetic sensor, in a frequency range or by using movement dynamics of the user.

When the inclination angle of the device is calculated by using a reaction acceleration vector at which the user takes a step, the inclination angle of the device with respect to the moving direction of the user may have an error because the reaction acceleration vector may not be easily distinguished due to sensor noise. Although final calculated angle information may be filtered by a low pass filter to reduce errors, calculation time may be delayed due to the filtering process.

The present disclosure provides a method of efficiently distinguishing between gravitational acceleration, vertical acceleration, and horizontal acceleration based on information sensed by only an accelerometer, by recognizing movement characteristics of the user as the user moves. By distinguishing the gravitational acceleration from acceleration information, the inclination angle of the device with respect to the moving direction of the user may be more accurately calculated compared to methods in the related art. This technology may increase position calculation accuracy of mobile phones, and perform position calculation using low power by reducing sensing power consumption.

SUMMARY

Provided is a method of determining an angle between a moving direction of a user and a heading direction of a device, and a rotation angle of the device may be accurately calculated by using an acceleration component.

Additional aspects will be set forth in part in the description which follows and, in part, will be apparent from the description, or may be learned by practice of the presented exemplary embodiments.

According to an aspect of an exemplary embodiment, a method of determining a rotation angle of a device with respect to a proceeding direction of the device, includes obtaining, from an accelerometer of the device, acceleration information related to movements of the device, transforming coordinates of the acceleration information of the device, filtering the acceleration information on the transformed coordinates of the device, and determining the rotation angle of the device with respect to the proceeding direction of the device by using gravitational acceleration of gravity information on the transformed coordinates. The gravitational acceleration information is derived by using information about a time point when a vertical acceleration component at the transformed coordinates of the device has a maximum value, from among the acceleration information.

The time point when the vertical acceleration component at the transformed coordinates of the device has the maximum value may be the same as a time point when a magnitude of acceleration of the obtained acceleration information has a maximum value.

A minimum value of the vertical acceleration component at the transformed coordinates may be derived by using the information about the time point when the vertical acceleration component at the transformed coordinates has the maximum value.

A horizontal acceleration component included in the acceleration information may correspond to acceleration information with respect to the proceeding direction of the device, and the vertical acceleration component may be an acceleration component between the device and a horizontal plane.

The transforming of the coordinates of the acceleration information may include transforming the acceleration information from coordinates on a coordinate system based on the device into coordinates on a coordinate system based on a direction of gravity.

The coordinate system based on the direction of gravity may include three axes that are perpendicular to one another, and a first axis from among the three axes may be parallel to a gravitational acceleration direction.

A second axis from among the three axes may be defined by rotating an axis of the coordinate system based on the device at a roll angle, and a third axis from among the three axes may be defined by rotating another axis of the coordinate system based on the device at a pitch angle.

The vertical acceleration component and a horizontal acceleration component at the transformed coordinates may change according to an identical cycle.

The vertical acceleration component and a horizontal acceleration component at the transformed coordinates may have a phase difference of 90°.

The vertical acceleration component may lead the horizontal acceleration component by 90°.

The vertical acceleration component may lag the horizontal acceleration component by 90°.

The gravitational acceleration information may be derived by averaging a magnitude of the vertical acceleration component and a magnitude of a horizontal acceleration component at the transformed coordinates of the device with respect to a plurality of cycles.

The filtering of the acceleration information may include transforming the acceleration information into a frequency range.

The filtering of the acceleration information may include band-pass filtering the acceleration information.

The band-pass filtering may include filtering the acceleration information that is transformed into the frequency range, based on a central frequency that is determined by using dynamics of the device.

The dynamics of the device may be obtained according to a position of a user of the device walking in the proceeding direction.

According to an aspect of another exemplary embodiment, a device configured to determine a rotation angle of the device with respect to a proceeding direction of the device, includes an accelerometer configured to obtain acceleration information related to movements of the device, a storage unit configured to store the acceleration information, and a controller configured to transform coordinates of the acceleration information, filter the acceleration information at the transformed coordinates, and determining the rotation angle of the device with respect to the proceeding direction of the device by using gravitational acceleration information at the transformed coordinates. The gravitational acceleration information is derived by using information about a time point when a vertical acceleration component at the transformed coordinates of the device has a maximum value, from among the acceleration information.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
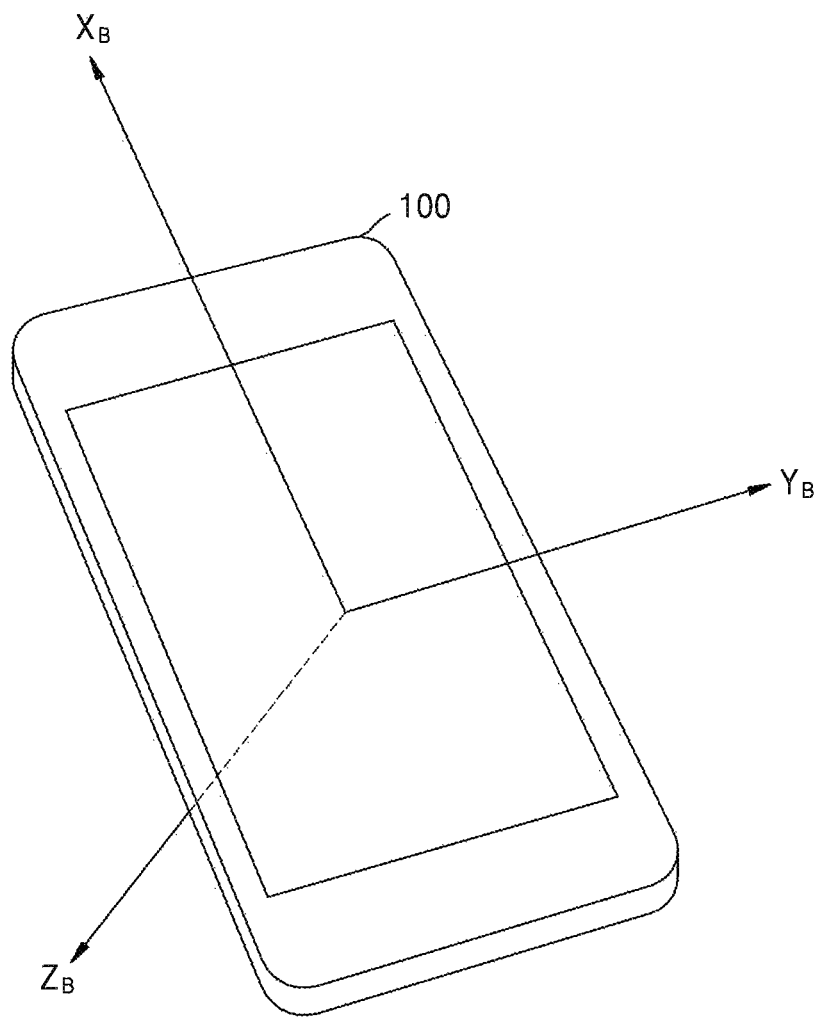
FIG. 1 is a diagram of a rotation axis of a device, according to an exemplary embodiment.

Reference will now be made in detail to exemplary embodiments, examples of which are illustrated in the accompanying drawings, wherein like reference numerals refer to like elements throughout. Sizes or thicknesses of components in the drawings may be exaggerated for convenience of description and clarity. Expressions such as "at least one of," when preceding a list of elements, modify the entire list of elements and do not modify the individual elements of the list.

In the present disclosure, a "rotation angle" of a device refers to an angle related to a position in a 3-dimensional (3D) space based on a coordinate system. "Rotation angle" may have the same meaning as "inclination angle" in the 3D space, and both terms may be used in the present disclosure. Also, the term "rotation angle" may refer to an angle between axes in a random coordinate system. In the present disclosure, a "body frame" refers to coordinates of x-, y-, and z-axes based on a device, the x-, y-, and z-axes being perpendicular to one another. The x-axis corresponds to a major axis direction of the device, the y-axis corresponds to a minor axis direction of the device, and the z-axis corresponds to a direction determined according to the right-hand rule based on the x- and y-axes. When four fingers of the right hand are rolled in a direction of the x-axis toward the y-axis, a direction indicated by the thumb corresponds to the z-axis. That is, the body frame is a coordinate system in which the z-axis is defined as a direction from top to bottom of a device, such as a smartphone.

In the present disclosure, a "local frame" refers to a 3D coordinate system. In relation to the body frame, properties of the local frame are as below. First, when the device is rotated by '−1*roll angle' about the x-axis of the body frame, the y-axis of the body frame is located at a y'-axis in a plane perpendicular to a gravitational acceleration direction. When the device is rotated by '−1*pitch angle' about the y'-axis, the x-axis is located at an x'-axis in a plane perpendicular to a gravitational acceleration direction. Therefore, the local frame is a coordinate system in which three axes are defined; that is, the determined x'- and y'-axes may be respectively defined as an x-axis and a y-axis of the local frame, and a z-axis may be defined according to the right-hand rule based on the x- and y-axes.

In the local frame, the z-axis is a direction parallel to the gravitational acceleration direction, the x-axis indicates 0° when the x-axis is the same as a proceeding direction of the device, and the y-axis is determined according to the determined x- and z-axes. The three axes are perpendicular to each other. Therefore, the local frame may be understood as a coordinate system that includes features described in the present disclosure, from among coordinate systems having three axes which are perpendicular to one another in the 3D space.

Hereinafter, a method of calculating a rotation angle of a device according to exemplary embodiments will be described with reference to FIGS. 1 to 20.

FIG. 1 is a diagram of a rotation axis of a device 100, according to an exemplary embodiment.

Since the device 100 moves in a 3D space, the device 100 may be located in any direction at any angle. All devices have a 'physical center' and three axes based on the physical center. The term 'physical center' may refer to the center of gravity, a geometrically defined center, a position of an accelerometer, and the like. Three axes may be present based on the center of the device 100 in a front-back direction, a left-right direction, and an up-down direction. The three axes may be randomly defined axes that are perpendicular to each other, and may vary according to a physical structure of the device 100. For example, when the device 100 is rectangular cuboid-shaped, such as a smartphone, a display unit displaying images may be set as a front surface and three axes may be defined about the display unit. Alternatively, when the device 100 is spherical-shaped and a front surface cannot be determined, the three axes may be defined based on any direction.

As shown in FIG. 1, the three axes of the device, i.e., x-, y-, and z-axes, may be defined about the center of the device 100, based on a portrait direction in which a display unit (not shown) of the device 100 is toward the front and vertically positioned.

The x-, y-, and z-axes that are configured based on the device 100 may be perpendicular to each other and referred to as a body frame. The x-, y-, and z-axes of the body frame may be fixed with respect to the device 100 and change as a position of the device 100 changes in the 3D space. In the present disclosure, the x-, y-, and z-axes may be respectively indicated by $X_B$, $Y_B$, and $Z_B$, wherein the subscript 'B' refers to the first letter of "body frame."

Figure 2:
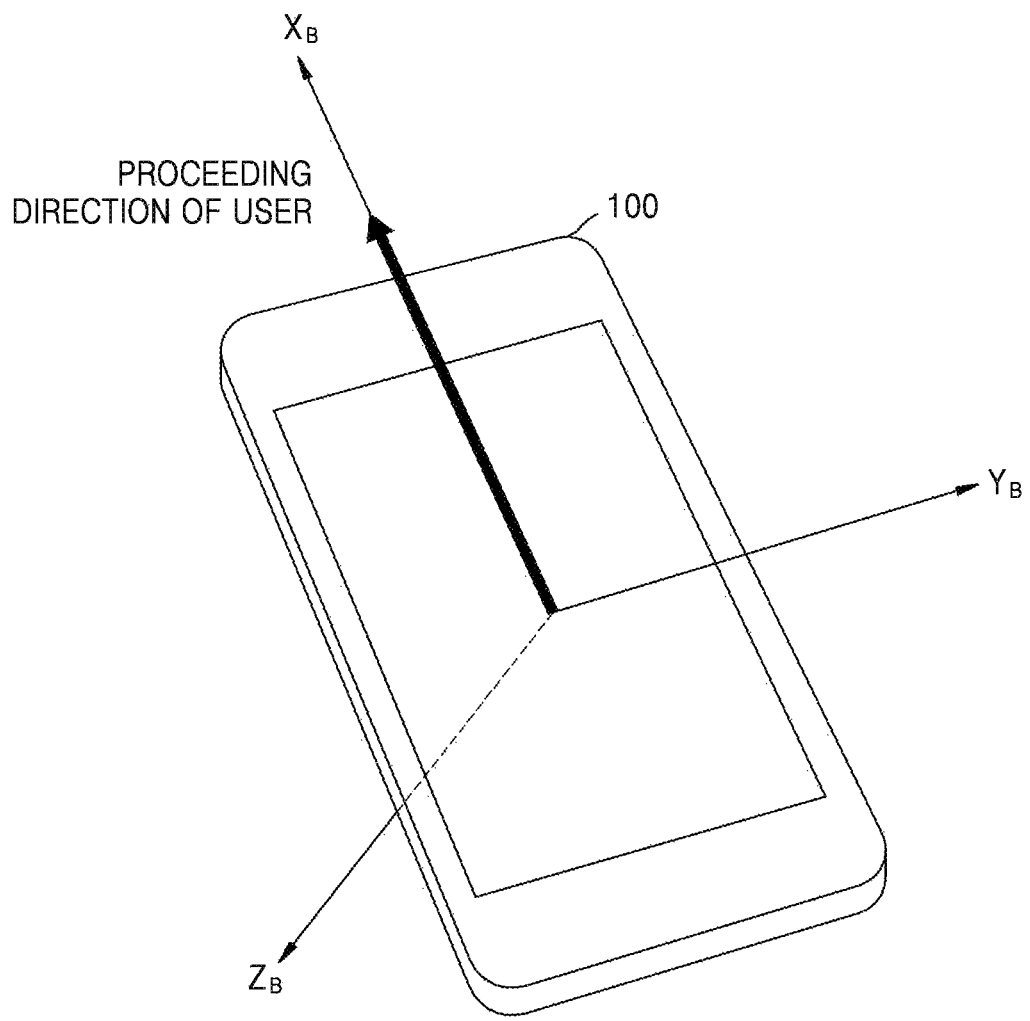
FIGS. 2 to 4 are diagrams of an inclined state of a device with respect to a proceeding direction of the device, according to an exemplary embodiment.
Figure 3:
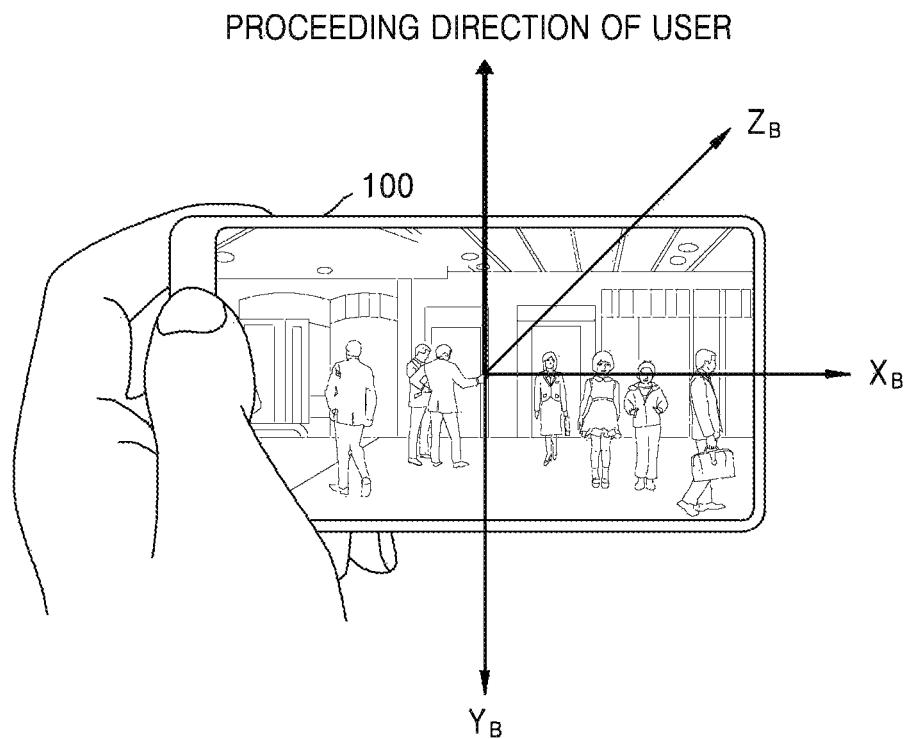
Figure 4:
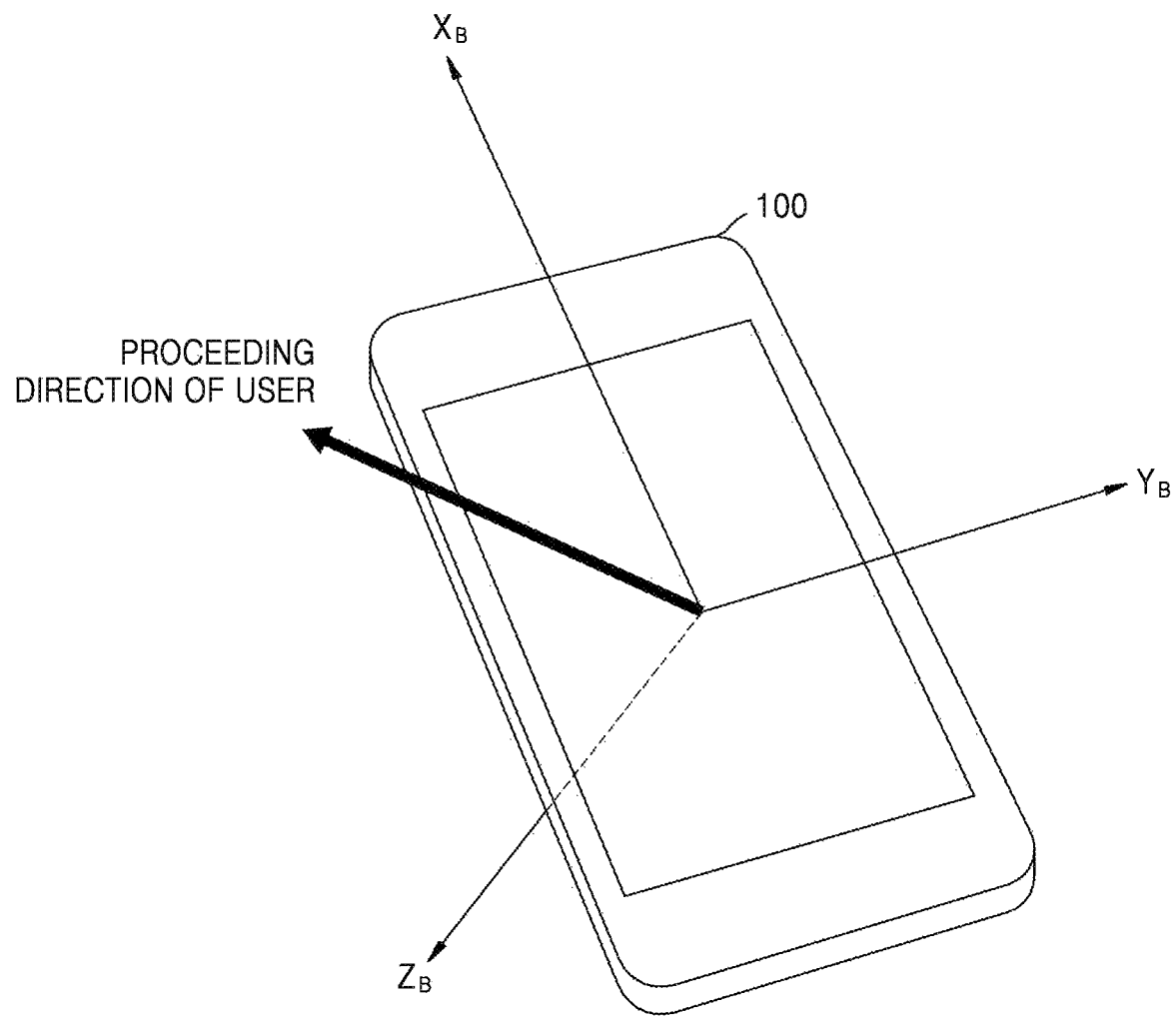

FIGS. 2 to 4 are diagrams of an inclined angle of the device 100 with respect to a proceeding direction of the device 100, according to an exemplary embodiment.

More people are travelling because of the development of transportation (e.g., automobiles, subways, etc.). When travelling, people tend to carry devices such as smartphones, tablet PCs, etc. Device users may utilize services when travelling by using various applications that are executed in the devices. A location based service (LBS) may allow the users to immediately identify services that may be used at the current location while travelling and select to use a desired service. Also, the users may reproduce content, such as games or movies, in the devices regardless of the current location.

When a user uses a navigation application, different information may be displayed on the device 100 according to a proceeding direction and moving velocity of the device 100. Alternatively, when the user is using a game application, control settings and display settings may vary depending on whether the user is using the device 100 in a portrait mode or a landscape mode. Therefore, a method of accurately measuring an inclination angle of the device 100 may be valuable. The inclination angle of the device 100 refers to an angle between two vectors, i.e., an angle between a vector in a proceeding direction of the user and a heading vector of the device with respect to a plane that is perpendicular to a gravity vector.

As shown in FIG. 2, the user may grip the device while having the proceeding direction of the user to be the same as a major axis of the device 100. The user may move while gripping the device 100 and watching a screen of the device 100 in a portrait (a direction corresponding to the major axis direction of the device 100) mode.

For example, when the user is moving while being guided by a navigation application of a device, the user may match the heading vector of the device with a proceeding direction of the user (or the device).

As shown in FIG. 3, the user may match the heading vector of the device 100 with a direction perpendicular to the proceeding direction of the user (or the device 100), and move while watching the screen of the device 100 in a landscape (a direction corresponding to the minor axis direction of the device 100) mode. In this case, a rotation state of the device 100 with respect to the proceeding direction of the user (or the device 100) may be different from the case described with reference to FIG. 2.

As shown in FIG. 4, the user may be moving while the proceeding direction of the user (or the device 100) is not matched with an axis of the device 100 and the device 100 maintains a random inclination angle. For example, the user may be carrying the device 100 in a bag or a pocket, and walking while using an audio direction guide service from a navigation application. In this case, the heading vector of the device 100 in a bag or a pocket may be not corresponding to the proceeding direction of the user (or the device 100).

FIGS. 5A through 5D are diagrams of a coordinate system that may be applied to an exemplary embodiment.

In order to calculate an inclination angle of a device, information may be received via various sensors in the device, and desired angle information may be obtained by processing the received information. The angle information may be shown by using various coordinate systems, and an angle measurement criterion may vary according to which coordinate system is used. Therefore, it may be valuable to process various pieces of information shown by using various coordinate systems such that the various pieces of information are compatible to one another.

An example of a coordinate system of pedestrian dead reckoning (PDR may include a body frame or a local frame. Various coordinate systems are present, and exemplary embodiments in the present disclosure are not limited to the two coordinate systems described herein. The two coordinate systems are provided only as an example for convenience of description.

Figure 5A:
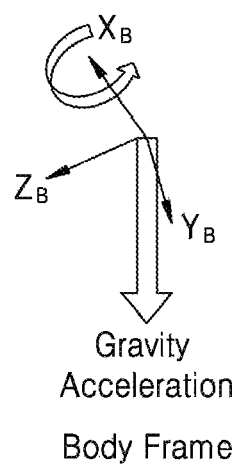
FIGS. 5A to 5D are diagrams of a coordinate system that may be applied to an exemplary embodiment.
Figure 5B:
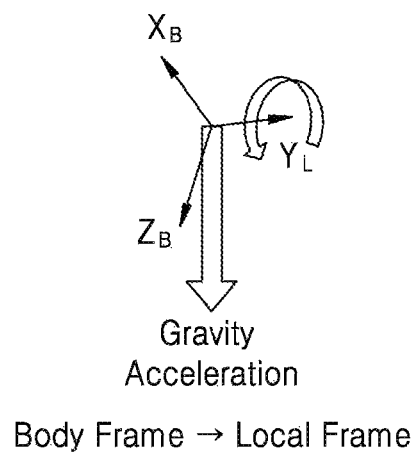
Figure 5C:
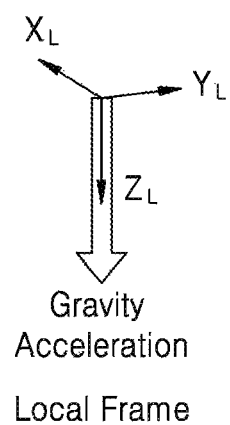

FIG. 5A shows a body frame that is randomly positioned to define a local frame, according to an exemplary embodiment. In FIG. 5A, a $Y_L$ axis of the local frame may be defined as a vector parallel to a plane in which a $Y_B$ axis of a body frame is perpendicular to a direction of gravity when the $Y_B$ axis and a $Z_B$ axis of the body frame is rotated about an $X_B$ axis of the body frame. That is, the $Y_L$ axis of the local frame may be perpendicular to a gravitational acceleration vector. In this case, rotation may be performed in two ways, the $Y_B$ axis and a $Z_B$ axis of the body frame may be rotated in a direction such that an angle between a $Z_B$ axis of the rotated body frame and the gravitational acceleration vector does not exceed 90°, as shown in FIG. 5B. An $X_L$ axis of the local frame may be defined as a vector parallel to a plane in which the $X_B$ axis of the body frame is perpendicular to the direction of gravity when the $X_B$ axis and the $Z_B$ axis of the body frame is rotated about the $Y_L$ axis of the local frame of FIG. 5B. In this case, rotation may be performed in two ways, and the $X_B$ axis and the $Z_B$ axis of the body frame may be rotated such that the $Z_B$ axis of the rotated body frame matches with the gravitational acceleration direction. Therefore, a $Z_L$ axis of the local frame is the same as the gravitational acceleration direction, as shown in FIG. 5C.

The origin of the local frame is the same as the origin defined in the body frame. The subscript 'L' of $X_L$, $Y_L$, and $Z_L$ of the local frame may indicate the first letter of 'local frame.' Therefore, since the $Z_L$ axis of the local frame is parallel to a gravitational acceleration axis as shown in FIG. 5C, only gravitational acceleration of the $Z_L$ axis may be sensed. Three axes of the local frame may be perpendicular to each other. Based on inclined position information between the local frame and the body frame in a 3D coordinate system, a direction and an inclination angle of a device with respect to a proceeding direction of a user may be shown on a horizontal plane that is perpendicular to the gravitational acceleration direction.

In order to identify a position in the local frame and the body frame, a roll angle, a pitch angle, and a yaw angle may be defined based on the local frame. With regard to the roll angle, 'rolling' refers to rotation around a front-back direction axis (i.e., x-axis) which is caused by a linear movement along a left-right direction axis (i.e., y-axis) of a coordinate system. With regard to the pitch angle, 'pitching' refers to rotation around the left-right direction axis (i.e., y-axis) caused by a linear movement along the x-axis of the coordinate system. With regard to the yaw angle, 'yawing' refers to rotation around a vertical direction axis (i.e., z-axis) of the coordinate system.

Figure 5D:
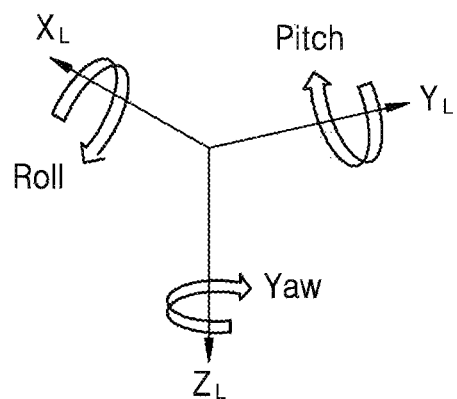

Referring to FIG. 5D, the origins of the two coordinate systems are the same. Based on the right-hand rule, when a right hand surrounds the $Z_L$ axis, a direction from the palm toward the fingers is a positive direction which may determine the sign of the yaw angle, and a rotation amount may determine a size of the yaw angle. In this case, the yaw angle may be 0° because the local frame is not transformed into the body frame by rotation about the z-axis. Same as the yaw angle, the pitch angle and the roll angle may be determined by using the right-hand rule, respectively based on the $Y_L$ axis and the $X_L$ axis. Determining an order of transformation may be valuable when transforming the local frame into the body frame. In the present disclosure, the local frame is transformed in the order of yaw, pitch, and roll. This is because, when transforming the body frame into the local frame, the order of transformation is determined as −1*roll angle, −1*pitch angle, and 0*(−1*yaw angle). The order of transformation may vary depending on the definition of coordinate transformation. Although the definition may vary, a transformation result of the body frame and the local frame (i.e., a position in each of the coordinate systems) does not change.

It should be noted that the body frame and the local frame are merely related to selecting a direction as a positive direction, in an identical space. Since coordinate systems are equivalent when all physical laws may be identically applied, coordinate systems may be transformed into one another. Also, in a coordinate transformation method, transformation processes and formulas may vary depending on how a coordinate system is defined and how a roll angle, a pitch angle, and a yaw angle are defined. However, this is merely a different in terms of expression, and the meaning of coordinate transformation is the same.

Figure 6:
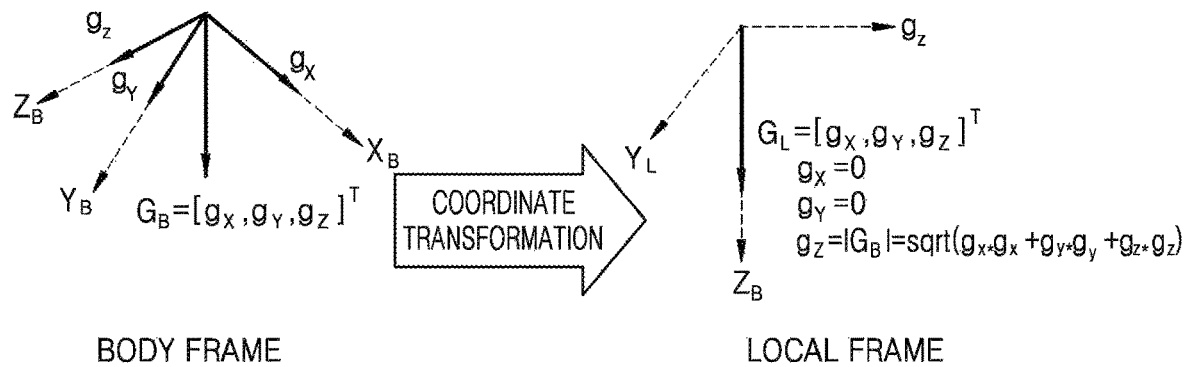
FIG. 6 is a diagram for describing coordinate transformation, according to an exemplary embodiment.

FIG. 6 is a diagram for describing coordinate transformation, according to an exemplary embodiment. In FIG. 6, coordinate transformation is performed with regard to only gravitational acceleration when a device is not moving.

Referring to FIG. 6, acceleration expressed in a body frame may also be expressed in a local frame. Likewise, information expressed in a local frame may be transformed and expressed in the body frame. Transformation between coordinate systems may vary depending on gravitational acceleration that is sensed in the body frame.

With regard to the body frame, gravitational acceleration $G_B$ is sensed via orthogonal projection for each of the three axes, i.e., $X_B$, $Y_B$, and $Z_B$ axes, wherein the subscript 'B' refers to 'body frame.' Therefore, the gravitational acceleration $G_B$ may be distinguished into $g_x$, $g_y$, and $g_z$ with respect to the three axes. That is, the gravitational acceleration $G_B$ is shown as an acceleration component for each of the three axes as shown below in EQN. (1).

Gravitational acceleration in body frame
$$G_B = [g_x, g_y, g_z]^T \qquad \text{EQN. (1)}$$

With regard to $G_B$, the superscript 'T' refers to 'transpose' of a vector. $G_B$ is a 3×1 vector. Acceleration components may vary depending on a determined coordinate system. The present disclosure mainly describes a transformation of the gravitational acceleration $G_B$ into a local frame that may be distinguished as an acceleration component at a gravitational acceleration axis (transformation of $G_B$ into $G_L$).

A transformation matrix may be used to transform information between coordinate systems. Performing coordinate transformation by using a transformation matrix C is shown as below in EQN. (2).

$$G_L = C_{Coordinate\ Transformation\ Matrix} * G_B \qquad \text{EQN. (2)}$$

Referring to FIG. 6 and EQN. (2), a coordinate system of $G_B$ is the body frame, and a coordinate system of $G_L$ is the local frame. There may be various reasons for transforming the body frame into the local frame. One of the reasons for performing coordinate transformation is to easily recognize and estimate the user's location. The body frame is usually a piece of information that is obtained by a sensor in a device such as a smartphone, and the local frame is the same as a navigation frame that is frequently used in navigation technology except for a difference in the yaw angle.

The body frame may include all components of the gravitational acceleration $G_B$ with respect to the x-axis, y-axis, and z-axis. With regard to acceleration that is generated as the user moves, a gravitational acceleration component and a component other than the gravitational acceleration component cannot be clearly distinguished in the body frame. Accordingly, the inclination angle of the device may not be accurately calculated. However, in the local frame, only the gravitational acceleration component is distinguished, the gravitational acceleration appears only on a vertical axis ($Z_L$) of the local frame, and an acceleration component in a proceeding direction of the user with respect to the $X_L$ axis and the $Y_L$ axis may be easily shown on a horizontal plane that is perpendicular to the gravitational acceleration. Thus, the inclination angle of the device with respect to the proceeding direction of the user may be accurately calculated.

EQN. (3) shows coordinate transformation performed by having the coordinate system of $G_B$ as the body frame and the coordinate system of the $G_L$ as the local frame.

$$G_L = C_{Coordinate\ Transformation\ Matrix} * G_B \quad \text{EQN. (3)}$$

The coordinate transformation matrix of EQN. (3) is shown in detail in EQN. (4), $$\begin{bmatrix} g_x \\ g_y \\ g_z \end{bmatrix}_{local} = \begin{bmatrix} \cos\theta\cos\psi & -\cos\phi\sin\psi - \sin\phi\sin\theta\cos\psi & \sin\phi\sin\psi - \cos\phi\sin\theta\cos\psi \\ \cos\theta\sin\psi & \cos\phi\cos\psi - \sin\phi\sin\theta\sin\psi & -\sin\phi\cos\psi - \cos\phi\sin\theta\sin\psi \\ -\sin\theta & \sin\phi\cos\theta & \cos\phi\cos\theta \end{bmatrix} \begin{bmatrix} g_x \\ g_y \\ g_z \end{bmatrix}_{body} \quad \text{EQN. (4)}$$

wherein $\phi$ denotes a roll angle, $\theta$ denotes a pitch angle, and $\psi$ denotes a yaw angle.

The roll angle and the pitch angle of the body frame of FIG. 6 may be derived by using EQN. (5) and EQN. (6) below. In EQN. (4), the yaw angle is 0° because the local frame is not transformed into the body frame by rotation about the z-axis.

$$\text{Roll}(\phi) = \tan^{-1}\left(\frac{-g_y}{-g_z}\right) \quad \text{EQN. (5)}$$

wherein g is the gravitational acceleration.

$$\text{Pitch}(\theta) = \tan^{-1}\left(\frac{g_x}{\sqrt{(g_y)^2 + (g_z)^2}}\right) \quad \text{EQN. (6)}$$

wherein g is the gravitational acceleration.

When coordinates are transformed according to EQN. (4), roll, pitch, and yaw angles may be accurately calculated when the acceleration component to be calculated only includes the gravitational acceleration component. However, the acceleration component is not likely to include only the gravitational acceleration component but also include a vertical acceleration component and a horizontal acceleration component, which thus may lead to an error in the coordinate transformation. Therefore, it may be valuable to provide a method of accurately distinguishing a gravitational acceleration component from acceleration information that is sensed by the device.

Figure 7:
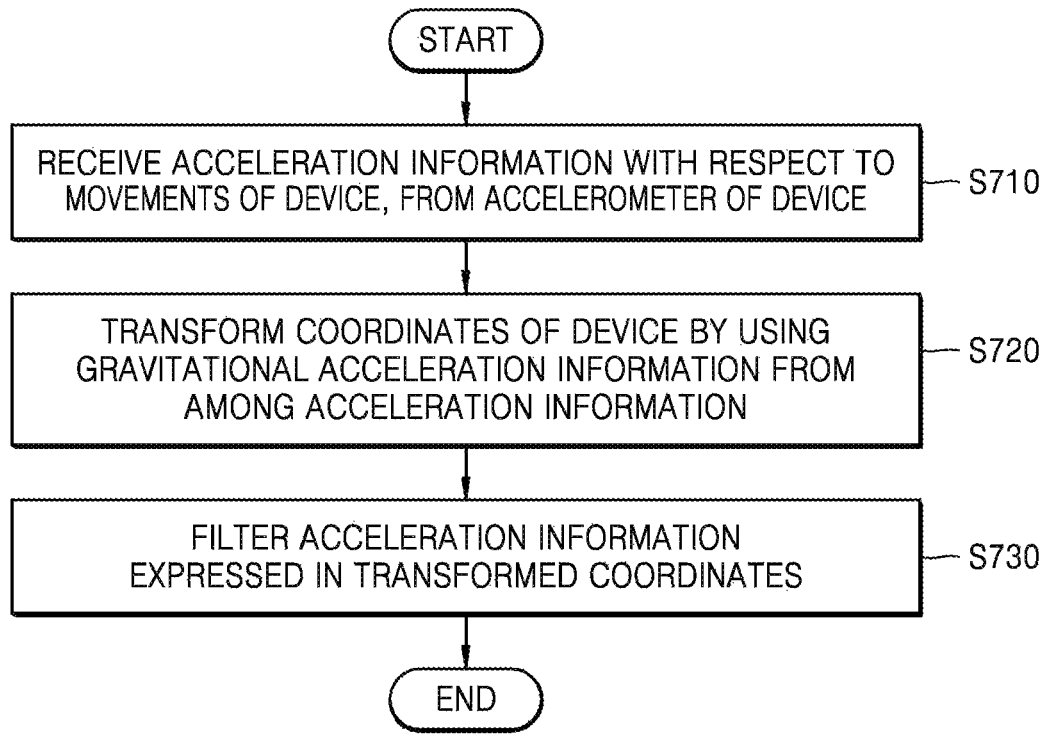
FIG. 7 is a flowchart of a process of calculating an angle of a device, according to an exemplary embodiment.

FIG. 7 is a flowchart of a process of determining a rotation angle of the device, according to an exemplary embodiment.

In operation S710, a device may receive acceleration information related to a movement of the device, from an accelerometer. The accelerometer may be included in the device and sense the acceleration information that may include a gravitational acceleration component, a vertical acceleration component, and a horizontal acceleration component.

In the present disclosure, the vertical acceleration component refers to an acceleration component that is generated by a height difference that occurs as a user moves, and a horizontal acceleration component refers to an acceleration component related to a proceeding direction of the user (or the device).

In operation S720, the device may transform coordinates of the device by only using gravitational acceleration information from the acceleration information. The acceleration information may include not only the gravitational acceleration component, but also the vertical and horizontal acceleration components. However, it is possible to only distinguish and use the gravitational acceleration component. When the acceleration component received by the device is expressed in a body frame, the acceleration component may be expressed in the body frame by performing coordinate transformation.

In operation S730, the device may remove sensor noise by filtering acceleration information expressed in the local frame. Since the vertical and horizontal acceleration components of the acceleration component sensed by the accelerometer based on the movements of the user may change according to a uniform cycle, frequencies of the vertical and horizontal acceleration components may be calculated and filtered by a band pass filter (BPF). The device may calculate the frequencies by deriving a frequency of a magnitude of acceleration. When the user moves forward, due to dynamics, the frequencies of the vertical and horizontal acceleration may be the same as the frequency of the magnitude of acceleration.

The horizontal acceleration information may be acceleration information related to a proceeding direction of the device, and the vertical acceleration information may be acceleration information between the device and a horizontal plane.

Hereinafter, the present disclosure describes a method of determining an inclination angle (rotation angle) of the device by analyzing changes in components of acceleration toward each axis of the device with respect to a proceeding direction of the user.

Figure 8:
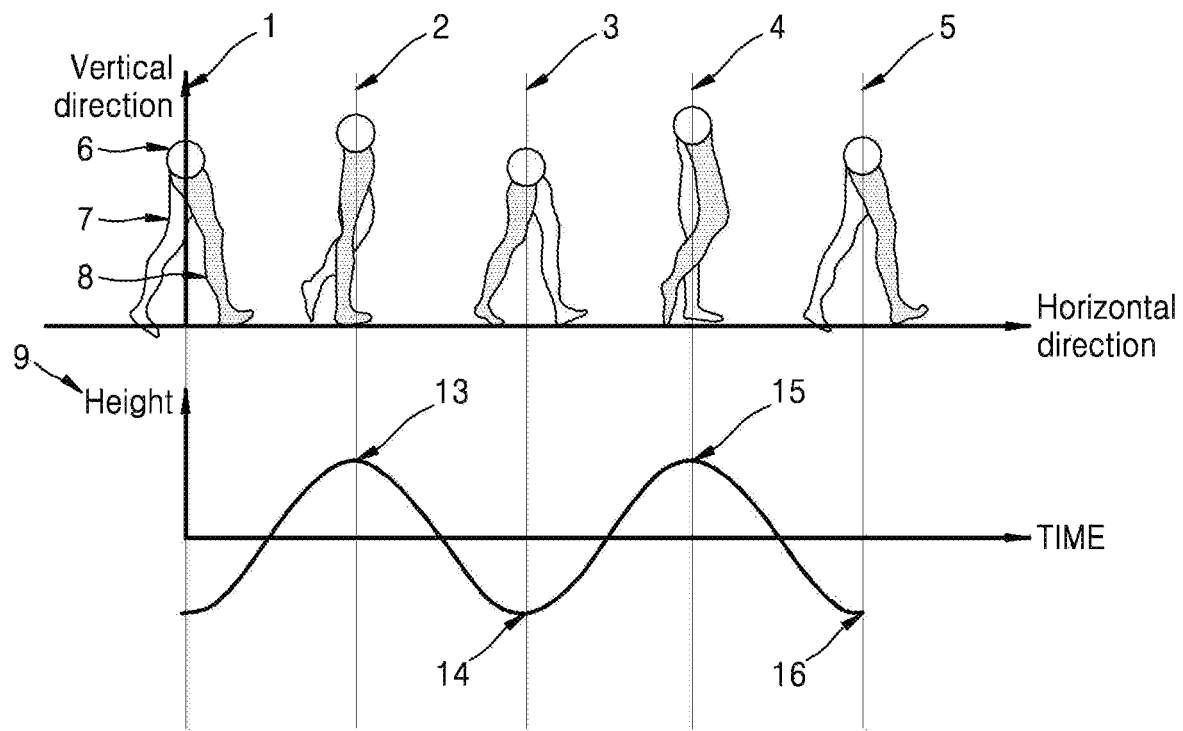
FIG. 8 is a diagram for describing a change in a vertical height with respect to a proceeding direction of a user, according to an exemplary embodiment.

FIG. 8 is a diagram for describing a change in a vertical height with respect to a proceeding direction of a user, according to an exemplary embodiment.

As shown in FIG. 8, the user may move in a constant direction (horizontal direction). Since the user walks with a left leg 7 and a right leg 8, the center of the user changes according to crossing of the legs. As the center of the user changes, a center of a device that is gripped by the user or moves with the user is also changed. Therefore, an acceleration component of the device changes according to movements of the user.

In order to analyze an acceleration component change according to a proceeding direction of the user, time points of a walking pattern of the user is described as below. First, a height change of the waist of the user is described to analyze a vertical acceleration component.

At a time point 1, the user takes a step by using a right leg 8 in the proceeding direction. When the user takes a step forward by using the right leg 8, a left leg 7 is located relatively behind, and thus, a height of a waist 6 of the user is the lowest due to a distance between the left leg 7 and the right leg 8.

At a time point 2, when the user takes a step by using the right leg 8 in the proceeding direction, the left leg 7 and the right leg 8 cross each other. Since the left leg 7 and the right leg 8 are crossing each other in this case, the height of the waist 6 is greater than the height of the waist 6 of the time point 1 and gradually increases until the maximum value.

At a time point 3, after the left leg 7 and the right leg 8 cross each other, the left leg 7 is placed at the front and the right leg 8 is located relatively at the back. In this case, as in the time point 1, the height of the waist 6 decreases due to the distance between the left leg 7 and the right leg 8 and has a minimum value.

At a time point 4, the left leg 7 and the right leg 8 cross each other. In this case, since the left leg 7 and the right leg 8 are crossing each other, the height of the waist 6 gradually increases compared to that of the time point 3 until the height is the same as that of the time point 2.

A time point 5 is the same as the above-described time point 1. The user takes a step by using the right leg 8 in the proceeding direction. When the user places the right leg 8 forward, the left leg 7 is placed relatively at the back, and the height of the waist 6 is the lowest according to the distance between the left leg 7 and the right leg 8.

With regard to the height change of the user in the time points 1, 3, and 5, identical patterns are shown in the time points 1, 3, and 5. As a single cycle through the time points 1 to 4, the height of the waist 6 changes over time in a pattern similar to the sine wave or the cosine wave. The height of the waist 6 has the maximum value at the time points 2 and 4 when the left leg 7 and the right leg 8 cross each other, and has the minimum value at the time points 1, 3, and 5 when a distance between the left leg 7 and the right leg 8 is the greatest.

Figure 9:
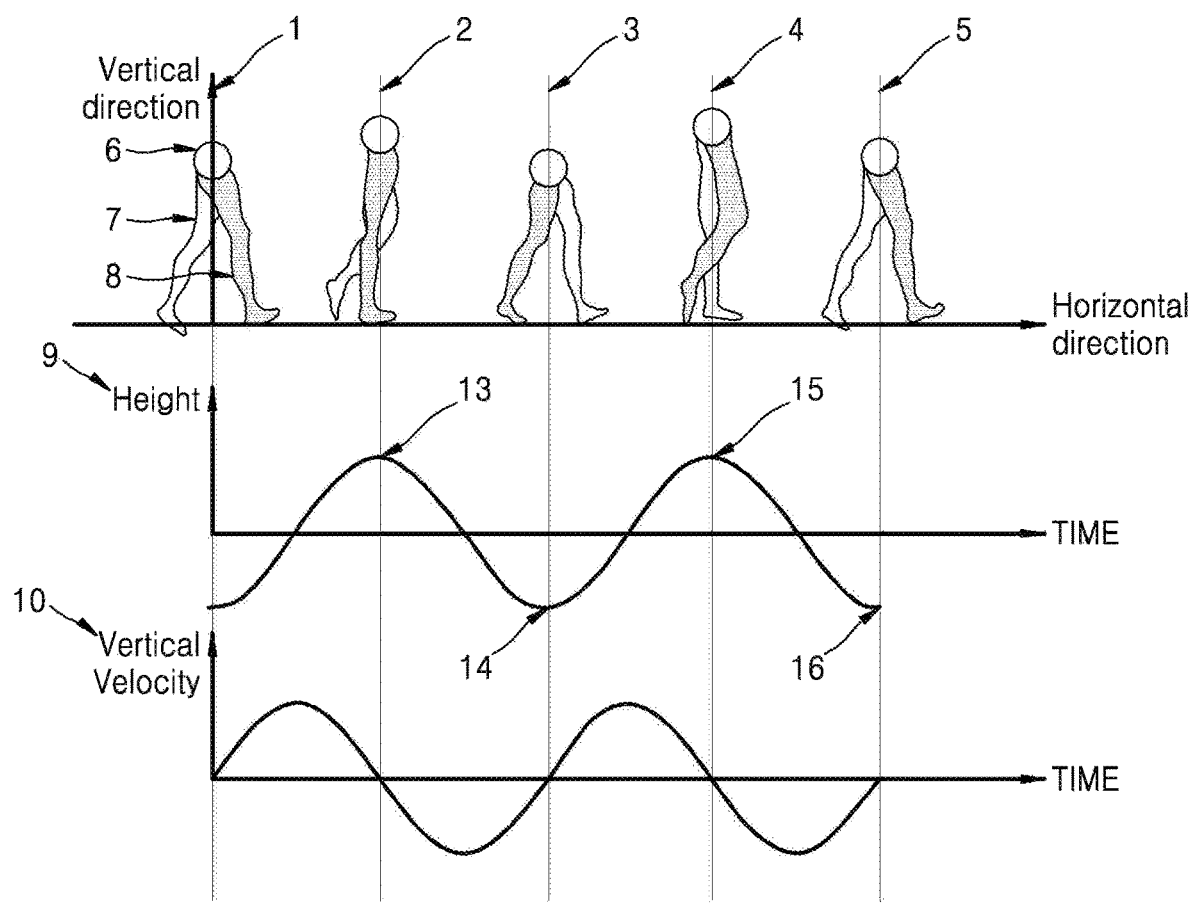
FIG. 9 is a diagram for describing a change in vertical velocity with respect to a proceeding direction of a user, according to an exemplary embodiment.

FIG. 9 is a diagram for describing a change in vertical velocity in with respect to proceeding direction of a user, according to an exemplary embodiment.

Since velocity may be calculated by differentiating distance with respect to time, a vertical velocity component may be acquired by differentiating a change in a waist height of the user in FIG. 8 with respect to time. Accordingly, a change in a vertical velocity with respect to time will be analyzed with reference to FIG. 9.

First, the waist height of the user increases in between time points 1 and 2, and vertical velocity has a positive value based on 0 (based on starting to move from a still state). A maximum value of the vertical velocity is at the middle of the two time points, and the vertical velocity decreases after the maximum value.

The waist height of the user decreases from the maximum value to a minimum in value between time points 2 and 3, and the vertical velocity has a negative value. The minimum value of the vertical velocity is at the middle of the two time points, and the vertical velocity increases after the minimum value.

The waist height of the user increases again from the minimum value to the maximum value in between time points 3 and 4, and the vertical velocity has a positive value. The maximum value of the vertical velocity is at the middle of the two time points, and the vertical velocity decreases again after the maximum value.

The waist height of the user decreases again from the maximum value to the minimum value in between time points 4 and 5, and the vertical velocity has a negative value. The minimum value of the vertical velocity is at the middle of the two time points, and the vertical velocity increases again after the minimum value.

In between the time points 1 to 5, the vertical velocity changes over time in a pattern similar to the sine wave or the cosine wave. The vertical velocity has the maximum value at the middle of the time points 1 and 2 and the middle of the time points 3 and 4, and has the minimum value at the middle of the time points 2 and 3 and the middle of time points 4 and 5.

Figure 10:
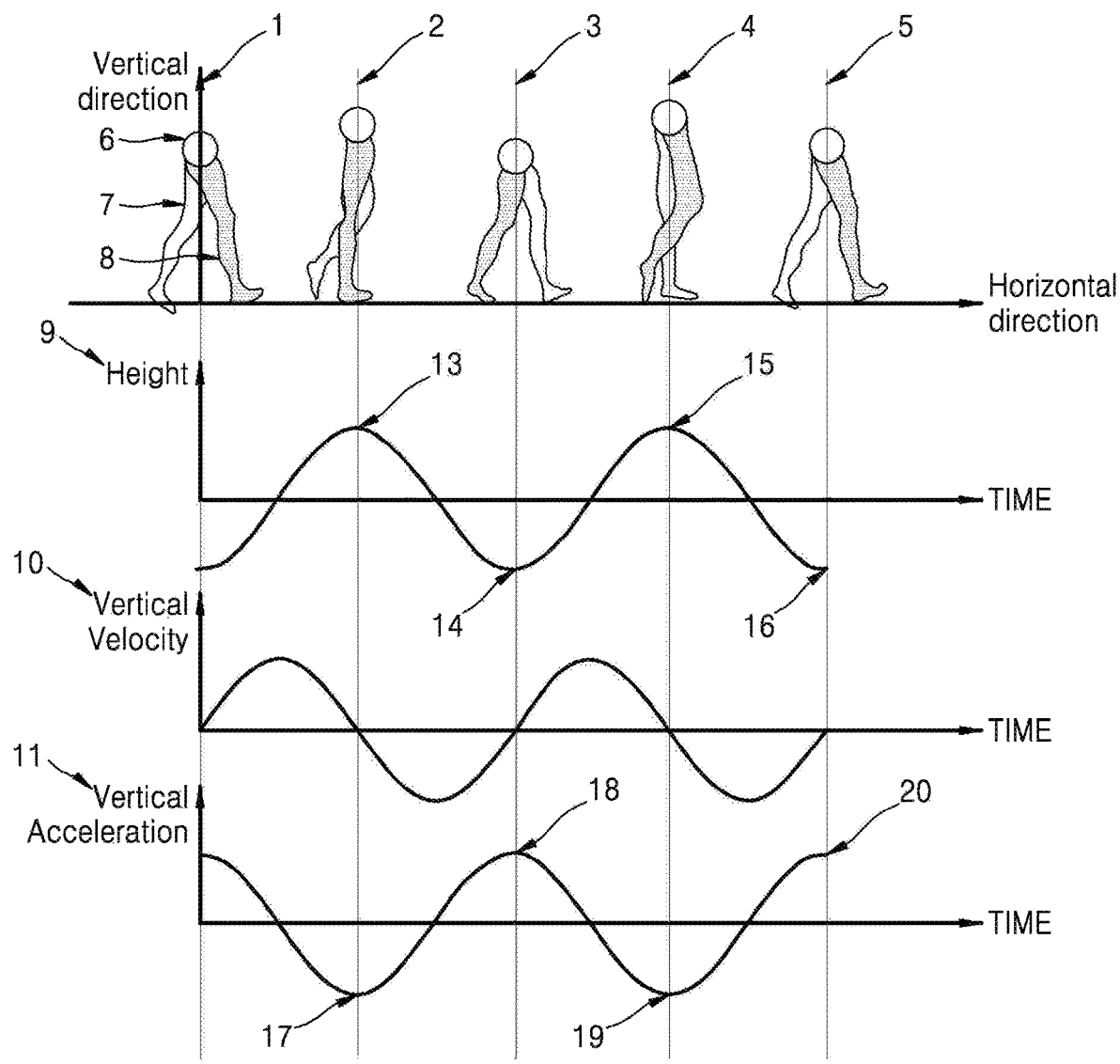
FIG. 10 is a diagram for describing a change in vertical acceleration with respect to a proceeding direction of a user, according to an exemplary embodiment.

FIG. 10 is a diagram for describing a change in vertical acceleration with respect to a proceeding direction of a user, according to an exemplary embodiment.

Since velocity may be calculated by differentiating distance with respect to time and acceleration may be calculated by differentiating velocity with respect to time, a vertical acceleration component may be acquired by differentiating a change in vertical velocity of the center of the user of FIG. 9 with respect to time. A change in the vertical acceleration with respect to time will be analyzed with reference to FIG. 10.

First, a value of acceleration, which is a derivative of velocity with respect to time, decreases from a positive value to a negative value in between time points 1 and 2. The value of acceleration increases from a negative value to a positive value in between time points 2 and 3.

A pattern between time points 3 and 4 is the same as a pattern between time points 1 and 2, and thus, a description thereof will be omitted.

A pattern between time points 4 and 5 is the same as a pattern between the time points 2 and 3, and thus, a description thereof will be omitted.

In between the time points 1 to 5, vertical acceleration changes over time in a pattern similar to the sine wave or the cosine wave. The vertical acceleration has a maximum value at the time points 1, 3, and 5, and a minimum value at the time points 2 and 4. Also, a change in a waist height of the user has a phase difference of 180° to a change in vertical acceleration. The height, velocity, and acceleration of the user with respect to a vertical axis periodically repeats the pattern in between the time points 1 to 3, similarly to the sine wave or the cosine wave which repeatedly shows a maximum and a minimum.

As described above with regard to the change in the vertical acceleration with reference to FIGS. 8 to 10, a change in horizontal acceleration according to a proceeding direction of the user will be described below.

Figure 11:
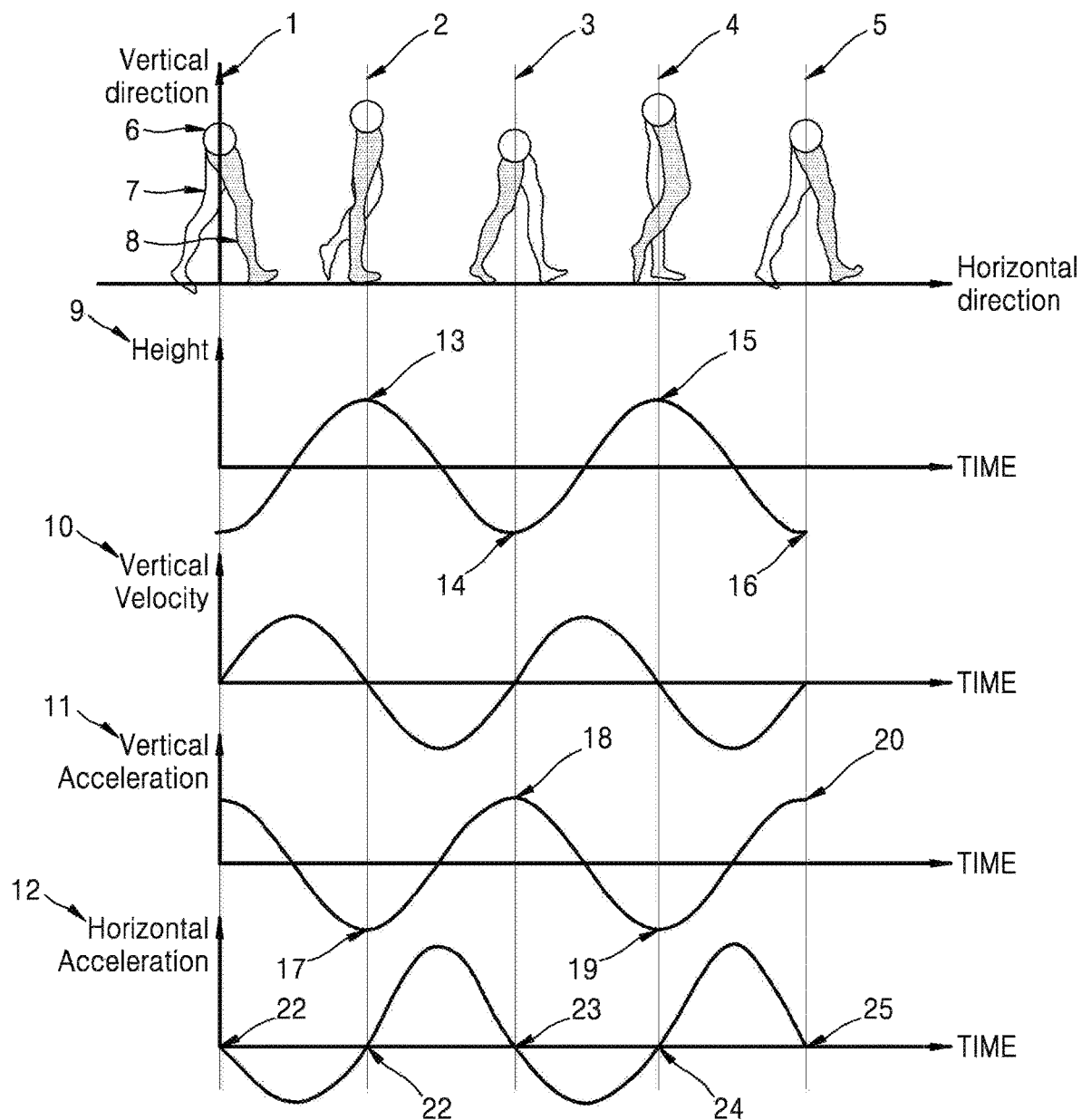
FIG. 11 is a diagram for describing a change in horizontal acceleration with respect to a proceeding direction of a user, according to an exemplary embodiment.

FIG. 11 is a diagram for describing a change in horizontal acceleration with respect to a proceeding direction of a user, according to an exemplary embodiment. Since a horizontal axis is the same as a moving direction of the user, an analysis on a distance and velocity will be omitted.

In between the time points 1 and 2, a horizontal acceleration component has a negative value. That is, velocity toward the proceeding direction of the user gradually decreases. The velocity decreases because the left leg 7 is pulled until the left leg 7 and the right leg 8 stepping forward are crossing each other.

In between the time points 2 and 3, since the user's weight is added to the right leg 8 and the user moves in the proceeding direction, a value of acceleration is a positive value. This is when the weight of the user starts to be located at the front of the right leg 8. The value of acceleration is positive because in the case that the user pushes his/her body by applying the same amount of force to legs touching a ground, greater momentum may be created along the horizontal axis when the weight of the user is at the front rather than at the back. In the previous section (between the time points 1 and 2), the weight of the user is behind the right leg 8 that is touching the ground, and the left leg 7 is floating in mid-air. If momentum needs to be created in this section, force needs to be horizontally as well as vertically applied to the right leg 8 that is touching the ground in order to raise the weight of the user upward against gravity. That is, additional force against gravity may be valuable. Therefore, in this section, it is more convenient for the user to use the inertia of the body trying to move forward rather than force to move forward. In between the time points 2 and 3, a vertical proceeding direction of the weight of the user is the same as the direction of gravity. Therefore, in this section, horizontal acceleration created as the user proceeds horizontally is added to vertical acceleration created as the weight free falls, and thus, a greater movement effect may be obtained with a smaller amount of force compared to the previous section.

A pattern between the time points 3 and 4 is the same as a pattern between the time points 1 and 2, and a pattern between the time points 4 and 5 is the same as a pattern between the time points 2 and 3, and thus, descriptions thereof will be omitted.

As the vertical acceleration component, a horizontal acceleration component also has a constant cycle with respect to time, and changes over time in a pattern similar to the sine wave or the cosine wave. Accordingly, the horizontal acceleration is perpendicular to the vertical acceleration in phase.

In FIG. 11, a maximum value of a positive horizontal acceleration component is greater than an absolute minimum value of a negative horizontal acceleration component, which indicates that the user has increased velocity while moving forward.

Figure 12:
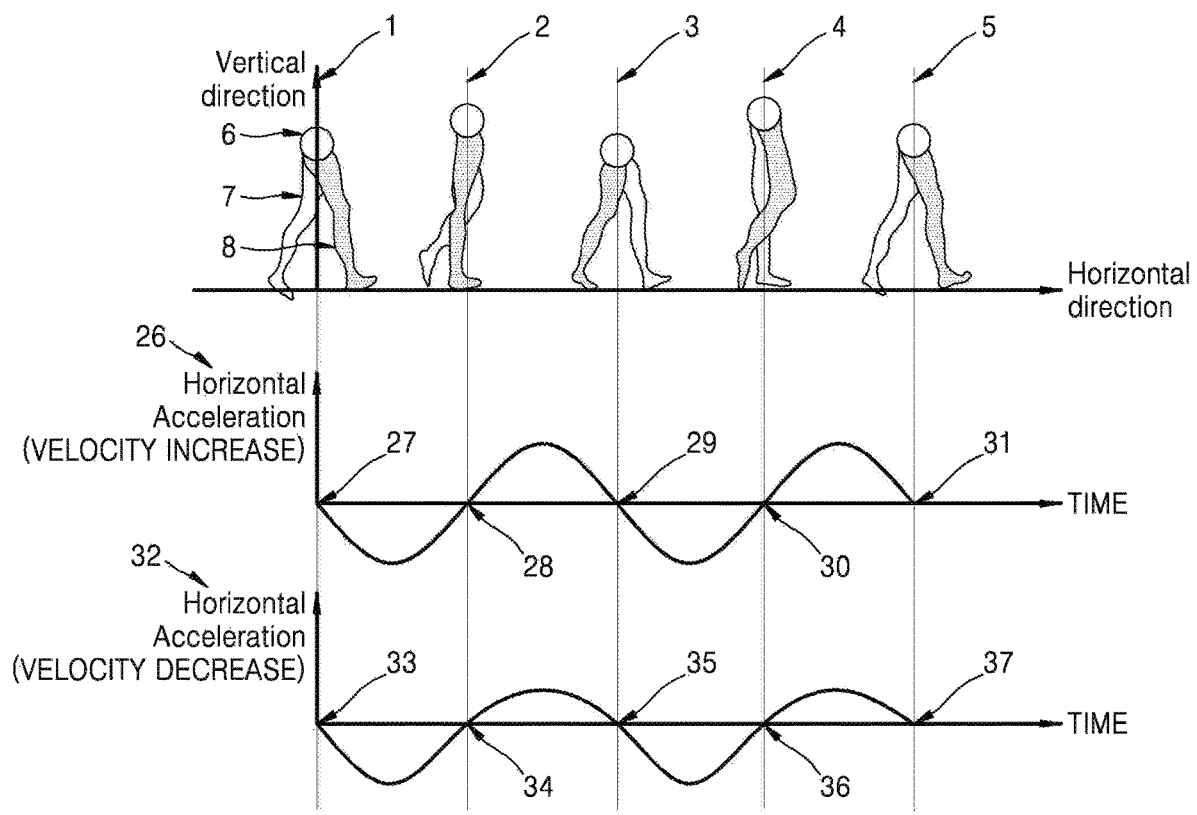
FIG. 12 is a diagram for describing examples in which a user moves with constant velocity and moves with decreasing velocity, according to an exemplary embodiment.

FIG. 12 is a diagram for describing an example 26 in which a user moves with constant velocity and an example 32 in which moves with decreasing velocity, according to an exemplary embodiment;

In the example 26, an absolute value of acceleration in between the time points 2 and 3 is the same as an absolute value of acceleration in between the time points 1 and 2 because acceleration in the proceeding direction of the user is similar to acceleration in an opposite of the proceeding direction. That is, the user moves with constant velocity in the example 26. A pattern between the time points 3 and 5 is the same as a pattern between the time points 1 and 3, and thus, a description thereof will be omitted.

In the example 32, an absolute value of acceleration in between the time points 1 and 2 is greater than an absolute value of acceleration in between time points 2 and 3 because the user decreases velocity and thus acceleration in the opposite of the proceeding direction of the user is greater than acceleration in the proceeding direction. A pattern between the time points 3 and 5 is the same as a pattern between the time points 1 and 3, and thus, a description thereof will be omitted.

Heretofore, the vertical acceleration component and the horizontal acceleration component have been analyzed with reference to FIGS. 8 to 12. Since an accelerometer of a device senses not only vertical and horizontal acceleration components but also an acceleration component including a gravitational acceleration component, it may be valuable to clearly distinguish the gravitational acceleration component from the vertical/horizontal acceleration component.

In order to analyze a rotation angle (i.e., roll, pitch, and yaw angles) of the device, gravitational acceleration has to be used on the local frame as in EQN. (4) through (6). Therefore, the roll, pitch, and yaw angles may be accurately calculated by distinguishing the gravitational acceleration component from acceleration information that is sensed by the accelerometer of the device.

In the present disclosure, a method of distinguishing the gravitational acceleration component from an acceleration component sensed by the accelerometer of the device will be mainly described with reference to FIG. 11.

Referring to FIG. 11, the vertical acceleration component and the horizontal acceleration component has a phase difference of 90° and may be shown in the form of sine waves that have maximum and minimum values. When the vertical acceleration component has the maximum value, the horizontal acceleration component is 0. That is, as shown in the drawing, the vertical acceleration component has the maximum value in between the time points 1 and 3. Since the time points are evenly divided, the vertical acceleration component has the minimum value at the time point 2, which is in the middle of the time points 1 and 3.

A controller of the device may acquire a gravitational acceleration component by merging the vertical acceleration component and the horizontal acceleration component of the time points 1 and 2. That is, the horizontal acceleration is 0 at the time point 1 when the vertical acceleration has the maximum value and at the time point 2 when the vertical acceleration has the minimum value, and thus, according to an average acceleration value of the acceleration component of the two time points, the vertical acceleration component also is 0. Therefore, the gravitational acceleration component may be separated from the average of two time points. The roll angle and the pitch angle of the device may be derived by using the gravitational acceleration component.

A time point when the vertical acceleration component has the maximum value is the same as a time point when a magnitude of acceleration sensed by the accelerometer of the device has the maximum value. Hereinafter, it will be proved that a time point when the vertical acceleration component has the maximum value according to the local frame is the same as a time point when the magnitude of acceleration has the maximum value according to the local frame.

Let f(t) be a magnitude of acceleration with respect to time t. Then, the square F(t) of the magnitude of acceleration in the local frame may be calculated as below by using EQN. (7).

$$F(t)=f(t)^2=AccX^2+AccY^2+AccZ^2 \qquad \text{EQN. (7)}$$

By substituting $AccX^2+AccY^2+AccZ^2$ in EQN. (7), EQN. (7) may be shown as EQN. (8).

Figure 13A:
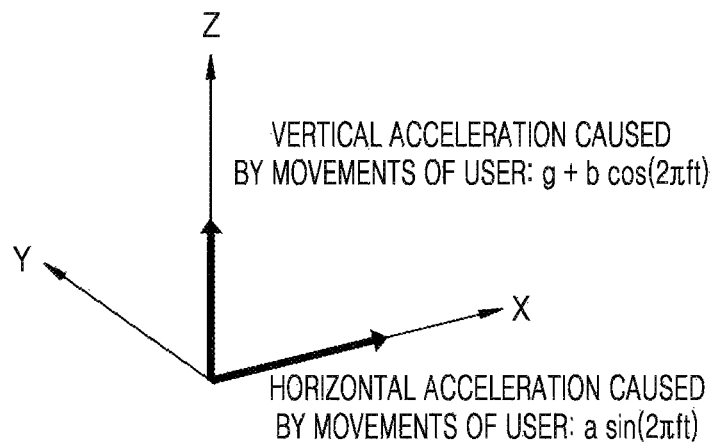
FIGS. 13A and 13B are diagrams of a coordinate system before and after coordinate transformation, according to an exemplary embodiment.
Figure 13B:
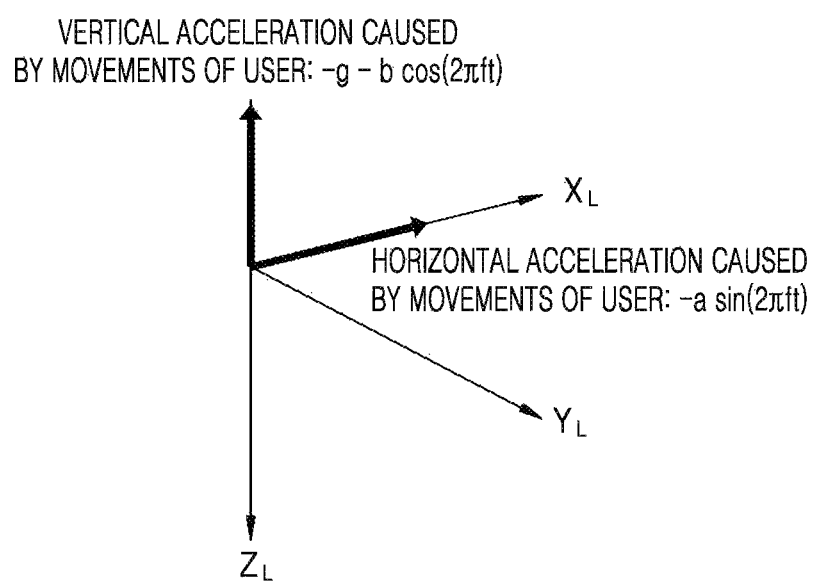

FIG. 13A and FIG. 13B show two coordinate systems and a local frame used in FIGS. 8 to 12. Referring to FIG. 11 as an example, with regard to a time period between an initial position 1 of the user to a final position 5 of the user, when the initial position 1 of the user is set as an origin, a vertical acceleration 11 is [g+b cos(2πft)], and a horizontal acceleration 12 is –a sin(2πft). Therefore, the square of the magnitude of acceleration expressed by using the coordinate system of FIG. 13A may be shown as below in EQN. (8).

$$F(t)=[-a\ \sin(2\pi ft)]^2+[g+b\ \cos(2\pi ft)]^2 \qquad \text{EQN. (8)}$$

In EQN. (8), f denotes step frequency of the user, π denotes the ratio of a circle's circumference to its diameter, t denotes time, g denotes gravitational acceleration and is greater than 0, a denotes a maximum acceleration value with respect to a proceeding direction of the user and is greater than 0, and b denotes a maximum acceleration value excluding gravitational acceleration when the user is moving.

By using the local frame, EQN. (8) may be expressed as EQN. (9), which is the same as EQN. (8) except for the sign of the vertical acceleration component. It should be noticed that the magnitude of acceleration is the same in two coordinate systems of FIG. 13A and FIG. 13B, but the sign of the vertical acceleration component is the opposite.

In the present disclosure, acceleration information is acquired and calculated based on the proceeding direction of the user (or the device 100), but the present disclosure is not limited thereto. The acceleration information may be calculated based on the opposite direction of the proceeding direction, and a rotation angle may be determined by appropriately transforming a positive or negative value according to the direction of acceleration. According to the present disclosure, it is possible to appropriately modify acceleration information and equations used in the method of determining a rotation angle with respect to the proceeding direction, based on the method of determining the rotation angle with respect to the opposite direction of the proceeding direction.

Figure 14:
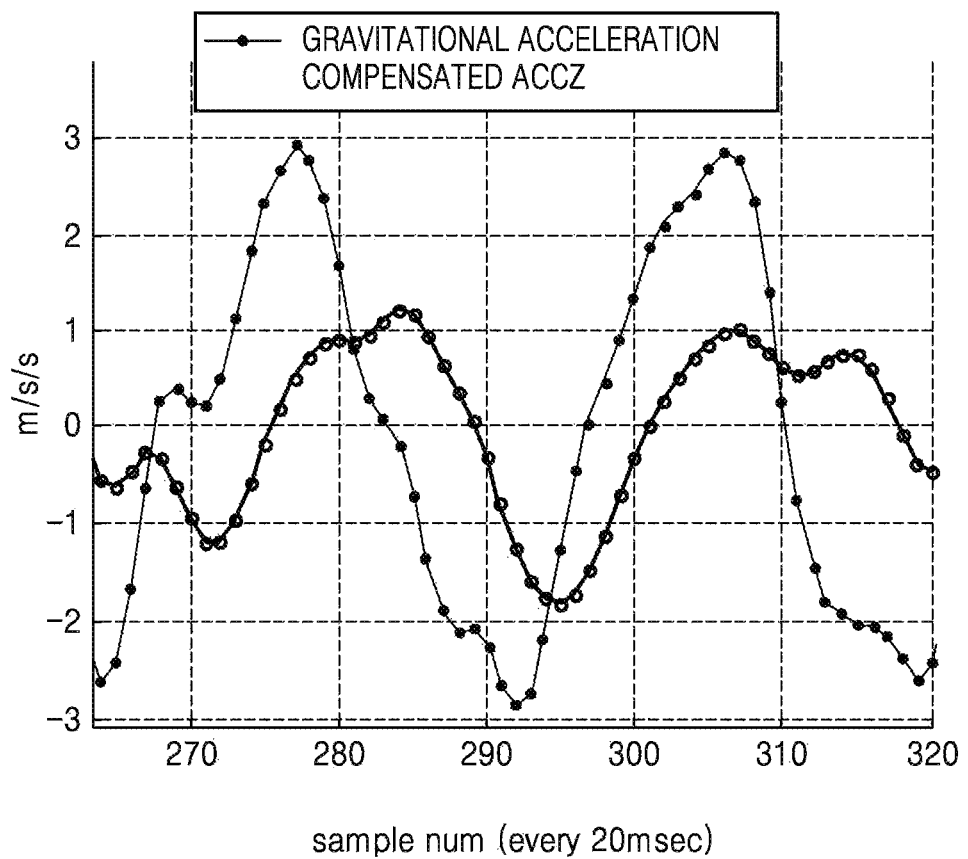
FIG. 14 is a graph showing z-axis acceleration in a transformed coordinate system, according to an exemplary embodiment.

FIG. 14 shows a graph of z-axis acceleration that is acquired by removing acceleration in an x-axis proceeding direction and the gravitational acceleration in a local frame, in the case that the user is matching a position of the device, i.e., a body frame, with the local frame and walking while matching a proceeding direction of the user with an x-axis of the local frame.

As shown in FIG. 14, although sensor noise is partially included, two accelerations are perpendicular to each other. The vertical acceleration of FIG. 11 is symmetrical with respect to a time axis because a vertical axis direction of the local frame is opposite to a vertical axis direction of the drawing, as described with reference to FIG. 13. In FIG. 14, a horizontal magnitude of acceleration refers to a maximum absolute value of acceleration when the user increases velocity, maintains constant velocity, or decreases velocity. In FIG. 14, the vertical acceleration is greater than the horizontal acceleration. This has been recognized though various experiments, and is used as a valuable feature when proving the above-described processes via EQN. (9) below.

$$F(t) = a^w \sin^2(2\pi ft) + [-g - b\cos(2\pi ft)]^2 \qquad \text{EQN. (9)}$$
$$= a^w \sin^2(2\pi ft) + [g + b\cos(2\pi ft)]^2$$

EQN. (10) shows differentiating EQN. (9) with respect to time to acquire maximum and minimum values of F(t) of EQN. (9).

$$\frac{dF(t)}{dt} = 4\pi f a^2 \sin(2\pi ft)\cos(2\pi ft) - \qquad \text{(EQN. 10)}$$
$$\qquad 4\pi f b(g + b\cos(2\pi ft))\sin(2\pi ft)$$
$$= -4\pi f \sin(2\pi ft)(-a^2\cos(2\pi ft) + b(g + b\cos(2\pi ft)))$$
$$= -4\pi f \sin(2\pi ft)[bg + (b^2 - a^2)\cos(2\pi ft)]$$

In order to find a maximum value and a minimum value, $\sin(2\pi ft)=0$ or $bg+(b^2-a^2)\cos(2\pi ft)=0$ has to be satisfied for the derivative to be equal to 0.

First, in order to satisfy $bg+(b^2-a^2)\cos(2\pi ft)=0$, $\cos(2\pi ft)$ may be either 0, positive, or negative.

i) When $\cos(2\pi ft)$ is 0, i.e., $\cos(2\pi ft)=0$, bg is greater than 0 and $bg+(b^2-a^2)\cos(2\pi ft)>0$. Thus, none of the conditions above is satisfied.

ii) When $\cos(2\pi ft)$ is positive, i.e., $\cos(2\pi ft)>0$, $bg+(b^2-a^2)\cos(2\pi ft)=0$ has to be satisfied, as shown below in EQN. (11).

$$a^2 \cos(2\pi ft) = bg + b^2 \cos(2\pi ft) \qquad \text{EQN. (11)}$$

EQN. (11) rearranged with respect to 'a' is shown below as in EQN. (12).

$$a = \sqrt{bg + b^2 \cos(2\pi ft))/\cos(2\pi ft)} \qquad \text{EQN. (12)}$$

If a is less than $\sqrt{bg+b^2\cos(2\pi ft))/\cos(2\pi ft)}$, $bg+(b^2-a^2)\cos(2\pi ft)>0$. $\sqrt{(bg+b^2\cos(2\pi ft))/\cos(2\pi ft)}$ has the minimum value is when t=0, i.e., the denominator is the greatest, and thus, $a < \sqrt{b^2-bg}$.

According to experiments for comparing maximum horizontal acceleration and maximum vertical acceleration, the maximum horizontal acceleration 'a' is smaller than the maximum vertical acceleration 'b,' and thus, $bg+(b^2-a^2)\cos(2\pi ft)>0$ is satisfied. That is, since $bg+(b^2-a^2)\cos(2\pi ft)=0$, the condition above is not satisfied.

iii) When $\cos(2\pi ft)$ is smaller than 0 (i.e., $\cos(2\pi ft)<0$), $(b^2-a^2)\cos(2\pi ft)\geq 0$, $bg+(b^2-a^2)\cos(2\pi ft)>0$, or $bg+(b^2-a^2)\cos(2\pi ft)=0$.

Based on experiments, in order to satisfy $bg+(b^2-a^2)\cos(2\pi ft)=0$ when a<b, EQN. (13) has to be satisfied.

$$\cos(2\pi ft) = \frac{bg}{a^2 - b^2} \qquad \text{EQN. (13)}$$

wherein a<b and $\cos(2\pi ft)<0$.

Since EQN. (13) may satisfy $bg+(b^2-a^2)\cos(2\pi ft)=0$ based on the values of 'a' and 'b,' EQN. (13) may have an extremum.

As a result, the magnitude of acceleration may have an extremum, i.e., a maximum value/minimum value, when both $\sin(2\pi ft)=0$ and EQN. (13) are satisfied, which is shown as below.

1) $\sin(2\pi ft) = 0$, $\cos(2\pi ft) = -1$

2) $\sin(2\pi ft) = 0$, $\cos(2\pi ft) = 1$

3) $\cos(2\pi ft) = \frac{bg}{a^2 - b^2}$, wherein $a < b$ and $\cos(2\pi ft) < 0$ The extremum of F(t) is obtained with respect to t that satisfies the condition 1), 2), or 3). Extrema under the conditions may be compared as below. First, the extremum of 1) compared with the extremum of 3) is as below in EQN. (14).

$$(g-b)^2 - \left[ a^2 - a^2\left(\frac{-bg}{b^2-a^2}\right)^2 + g^2 + 2bg\left(\frac{-bg}{b^2-a^2}\right) + b^2\left(\frac{-bg}{b^2-a^2}\right)^2 \right] = (g-b)^2 - \left( a^2 + g^2 + 2bg\left(\frac{-bg}{b^2-a^2}\right) + (b^2-a^2)\left(\frac{-bg}{b^2-a^2}\right)^2 \right) \qquad \text{EQN. (14)}$$

-continued $$= (g-b)^2 - \left(a^2 + g^2 + 2bg\left(\frac{-bg}{b^2-a^2}\right) + \left(\frac{b^2g^2}{b^2-a^2}\right)\right)$$

$$= (g-b)^2 - \left(a^2 + g^2 - \frac{b^2g^2}{b^2-a^2}\right)$$

$$= \frac{(g^2 - 2bg + b^2)(b^2 - a^2) + ((-a^2 - g^2)(b^2 - a^2) + b^2g^2)}{b^2 - a^2}$$

$$= \frac{\begin{array}{c}(b^2g^2 - 2b^3g + b^4 - a^2g^2 + 2a^2bg - a^2b^2) + \\ (-a^2b^2 + a^4 - b^2g^2 + a^2g^2) + b^2g^2\end{array}}{b^2 - a^2}$$

$$= \frac{(b^2g^2 - 2b^3g + b^4 + 2a^2bg - 2a^2b^2 + a^4)}{b^2 - a^2}$$

$$= \frac{((b^2 - a^2)^2 - 2bg(b^2 - a^2) + b^2g^2)}{b^2 - a^2}$$

When $(b^2-a^2)=X$ in EQN. (14), $G(X)=X^2-2bgX+b^2g^2$. With respect to a random value of 'a' and 'b,' a discriminant of $$G(X) \text{ is } \frac{D}{4} = (bg)^2 - b^2g^2 = 0.$$

Therefore, $G(X)$ has an equal root, and $X$ is as below in EQN. (15).

$$X = \frac{2bg \pm \sqrt{0}}{2} = bg \qquad \text{EQN. (15)}$$

Therefore, when $X=bg$, $G(X)$ has a minimum value of 0 as below.

$$G(bg)=(bg)^2-2bgbg++b^2g^2=0$$

Thus, a comparison of the three extrema is as below.

$$\therefore (g+b)^2 > (g-b)^2 \geq$$

$$\left(a^2 - a^2\left(\frac{-bg}{b^2-a^2}\right)^2 + g^2 + 2bg\left(\frac{-bg}{b^2-a^2}\right) + b^2\left(\frac{-bg}{b^2-a^2}\right)^2\right)$$

The comparison above corresponds to a comparison of acceleration (F(t)) under the conditions 1), 2), and 3) of EQN. (13).

That is, an extremum of $\sin(2\pi ft)=0$, $\cos(2\pi ft)=1$, is greater than an extremum of $\sin(2\pi ft)=0$, $\cos(2\pi ft)=-1$, and an extremum of $\sin(2\pi ft)=0$, $\cos(2\pi ft)=-1$ is the same as or greater than $$\cos(2\pi ft) = \frac{bg}{a^2 - b^2}.$$

Here, $(a+b)^2$ is an extremum as well as a maximum value of F(t), and may be proved as below.

$$F(t)=a^2 \sin^2(2\pi ft)+(g+b \cos(2\pi ft))^2$$

EQN. (16) shows a second derivative of F(t) differentiated with respect to t for obtaining a maximum value and a minimum value.

$$\frac{d^2F(t)}{dt^2} = \frac{d(-4\pi f \sin(2\pi ft)[bg + (b^2 - a^2)\cos(2\pi ft)])}{dt} \qquad \text{EQN. (16)}$$

$$= -8\pi^2 f^2 \cos(2\pi ft)[bg + (b^2 - a^2)\cos(2\pi ft)] + 8\pi^2 f^2 \sin(2\pi ft)(b^2 - a^2)$$

$$= -8\pi^2 f^2 bg\cos(2\pi ft) - 8\pi^2 f^2 (b^2 - a^2)\cos^2(2\pi ft) + 8\pi^2 f^2 (b^2 - a^2)\sin^2(2\pi ft)$$

$$= -8\pi^2 f^2 bg\cos(2\pi ft) - 8\pi^2 f^2 (b^2 - a^2)\cos^2(2\pi ft) + 8\pi^2 f^2 (b^2 - a^2)(1 - \cos^2(2\pi ft))$$

$$= -16\pi^2 f^2 (b^2 - a^2)\cos^2(2\pi ft) - 8\pi^2 f^2 bg\cos(2\pi ft) + 8\pi^2 f^2 (b^2 - a^2)$$

Therefore, when $\sin(2\pi ft)=0$, $\cos(2\pi ft)=1$ is satisfied, $F(t)=(g+b)^2$. Equation below shows a second derivative of F(t):

$$\frac{d^2F(t)}{dt^2} = -16\pi^2 f^2 (b^2 - a^2) - 8\pi^2 f^2 bg + 8\pi^2 f^2 (b^2 - a^2)$$

$$= -8\pi^2 f^2 bg - 8\pi^2 f^2 (b^2 - a^2) < 0$$

Thus, F(t) has the maximum value when the condition above is satisfied.

F(t) in this case is the square of the magnitude of acceleration in EQN. (7). A time point when the square of the magnitude of acceleration reaches the maximum is the same as a time point when the magnitude of acceleration reaches the maximum. A vertical axis in the local frame is toward a direction from the head of the user to the legs of the user, which is opposite to the vertical axis direction defined with reference to FIG. 10. Therefore, the formulas that have been proved so far have also been proved with regard to the local frame, and $\sin(2\pi ft)=0$, $\cos(2\pi ft)=1$ in the local frame indicates a point where $\sin(2\pi ft)=0$, $\cos(2\pi ft)=-1$ because the vertical axis direction is opposite to that of FIG. 10. That is, it is proved that the vertical acceleration reaches the maximum when the legs of the user cross each other (when a waist height of the user reaches the maximum), and at the same time, acceleration of three axes (2 norm value of acceleration vector) F(t) has the maximum value.

According to the calculation process above, the maximum value of acceleration sensed by the accelerometer of the device is the same as the maximum value of vertical acceleration that is expressed by using gravitational acceleration and $\cos(2\pi ft)$. However, the minimum value of vertical acceleration may be different from the minimum value of acceleration. Therefore, a time point when the acceleration reaches the minimum value may be obtained by calculating an average of two time points when acceleration has the maximum value and is near the minimum value.

The theoretical calculation process may be understood through simulation. The maximum acceleration in a vertical direction is changed from 0.1 m/s² to 30 m/s² with an interval of 0.1 m/s², the horizontal acceleration is changed with an interval of 0.1 from 0.1 times to 0.9 times acceleration. This reflects the experiment result in which the maximum value of the vertical acceleration is greater than the maximum value of the horizontal acceleration. Also, vertical and horizontal triangular pulses are simulated with an interval of 0.01° with respect to one cycle.

All simulation results show a time point when the vertical acceleration reaches the maximum is the same as a time point when the acceleration reaches the maximum. However, in some cases, a time point when the vertical acceleration reaches the minimum is different from a time point when the acceleration reaches the maximum.

Figure 15:
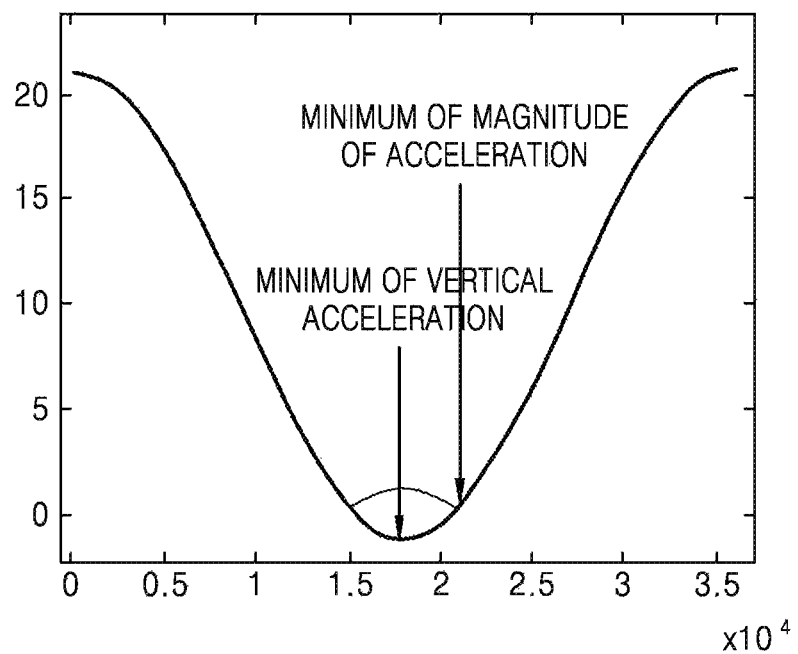
FIG. 15 is a graph showing that, according to a simulation, a time point when vertical acceleration has a minimum value in a local frame may be different from a time point when a magnitude of acceleration has a minimum value.

FIG. 15 is a graph showing that, according to a simulation, a time point when vertical acceleration reaches a minimum value may be different from a time point when acceleration reaches a minimum value in a local frame.

Although all analyses have been performed in the local frame, the acceleration from the accelerometer is all expressed in the body frame. In this case, a time point when vertical acceleration reaches a maximum value in the local frame being the same as a time point when acceleration reaches a maximum value in the local frame indicates that a time point when vertical acceleration reaches a maximum value in the body frame is the same as a time point when acceleration reaches a maximum value in the body frame. This is because a time point when acceleration sensed by three-axes accelerometers reaches the maximum value is the same as a time point when the acceleration reaches the minimum value whether the magnitude of acceleration is expressed in the local frame, in the body frame, or in any other coordinate systems with three perpendicular axes. Therefore, a roll angle and a pitch angle of the device may be obtained by only extracting gravitational acceleration from the maximum value of three-axes magnitude of acceleration (2 norm value of 3×1 acceleration vector) sensed by the accelerometer in the body frame.

The device may obtain information about a time point of a maximum value and a time point of a minimum value. The controller of the device may calculate a sum of averages of acceleration values according to axes with respect to the two time points, and obtain acceleration information in which only a gravitational acceleration component is only included in an acceleration component by removing a vertical acceleration component and a horizontal acceleration component.

Consequently, based on dynamics according to movements of the user, a roll angle and a pitch angle may be accurately calculated by using EQN. (5) and EQN. (6) to separate the gravitational acceleration component from acceleration components of the axes of the accelerometer of the device. A coordinate transformation matrix may be derived by substituting the calculated roll angle and the calculated pitch angle into EQN. (4). Then, three-axis acceleration in the local frame may be obtained by coordinate transforming three-axis acceleration in the body frame. Next, horizontal acceleration expressed in the x-axis and y-axis of the local frame may be calculated. Thus, an inclination angle on a horizontal plane of the device with respect to the proceeding direction of the user may be obtained.

Figure 16:
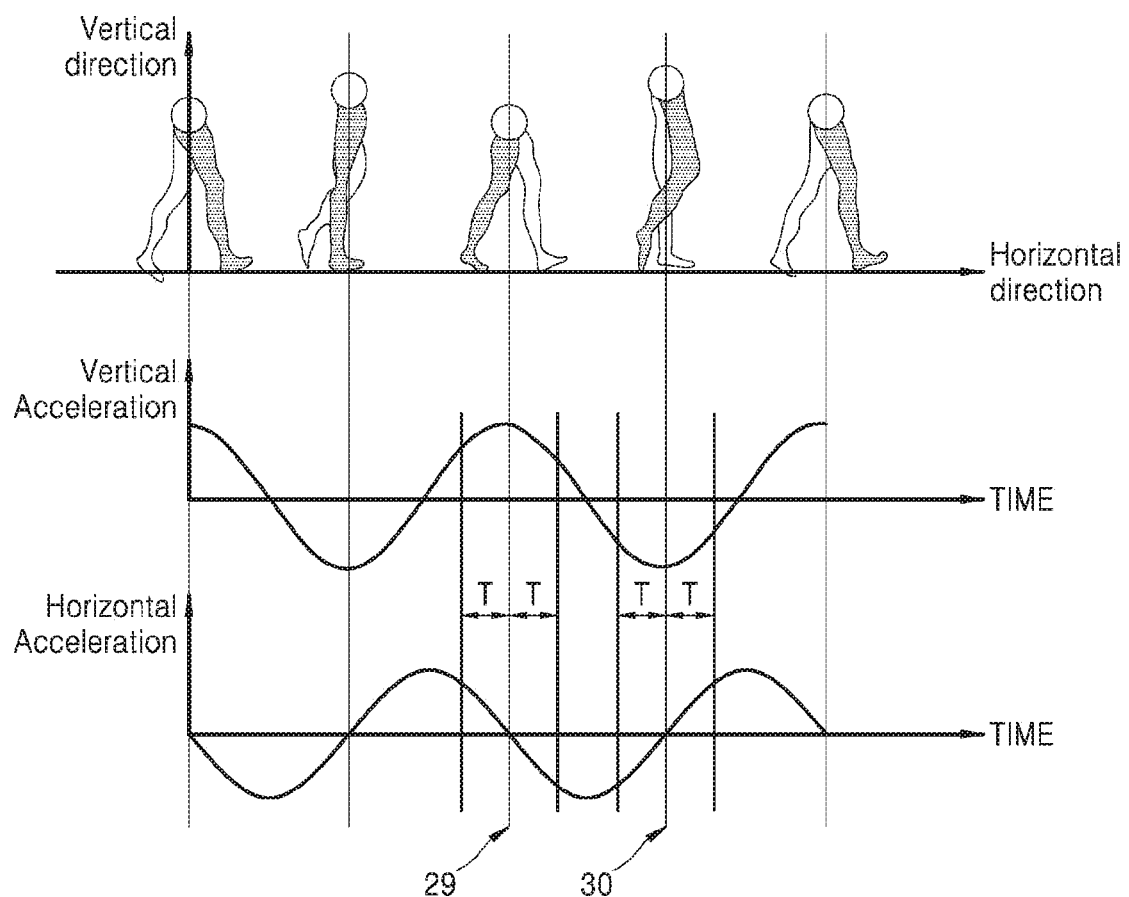
FIG. 16 is a diagram for describing a method of filtering acceleration components according to a proceeding direction of a user, according to an exemplary embodiment.

FIG. 16 is a diagram for describing a method of filtering acceleration components to reduce error due to noise when calculating a maximum value of a magnitude of acceleration in a body frame, according to an exemplary embodiment.

Rotation angle information of the device, which is obtained by the accelerometer of the device based on a gravitational acceleration component, may include noise. Therefore, error of the rotation angle of the device may be reduced by filtering obtained acceleration information.

It has been described above that acceleration changes according to a certain cycle over time as the user moves. Therefore, vertical acceleration and horizontal acceleration may each have a frequency, which will be referred to as "step frequency" for convenience. When moving, the user may cross left and right legs according to a certain cycle. However, this cycle may not be constant. Therefore, an average cycle may be estimated for a certain period so that a step frequency of the user may be adaptively estimated even when the step frequency changes.

On a graph showing vertical acceleration of FIG. 16, gravitational acceleration may be extracted by calculating an average of acceleration of a time point 29 when a vertical magnitude of acceleration has a maximum value and an average of acceleration of a time point 30 when the vertical magnitude of acceleration has a minimum value. However, error may be caused by sensor noise. Therefore, the average of acceleration of each of the two time points may be obtained based on previous and following time points of each of the time points 29 and 30. In the average of acceleration obtained in the body frame based on such filtering process, an average of vertical acceleration is a sum of a maximum value and a minimum value that offset one another, and horizontal acceleration is 0. Therefore, only the gravitational acceleration with less error caused by noise remains. If a magnitude of positive horizontal acceleration is similar to a magnitude of negative horizontal acceleration, T' may be increased by half cycles and a total cycle may be averaged to thus remove the gravitational acceleration. If the magnitude of the positive horizontal acceleration is similar to a magnitude of the negative acceleration, T' may be extended by N/2, wherein N is a natural number N, averaging N cycle, and thus removing the gravitational acceleration.

Figure 17:
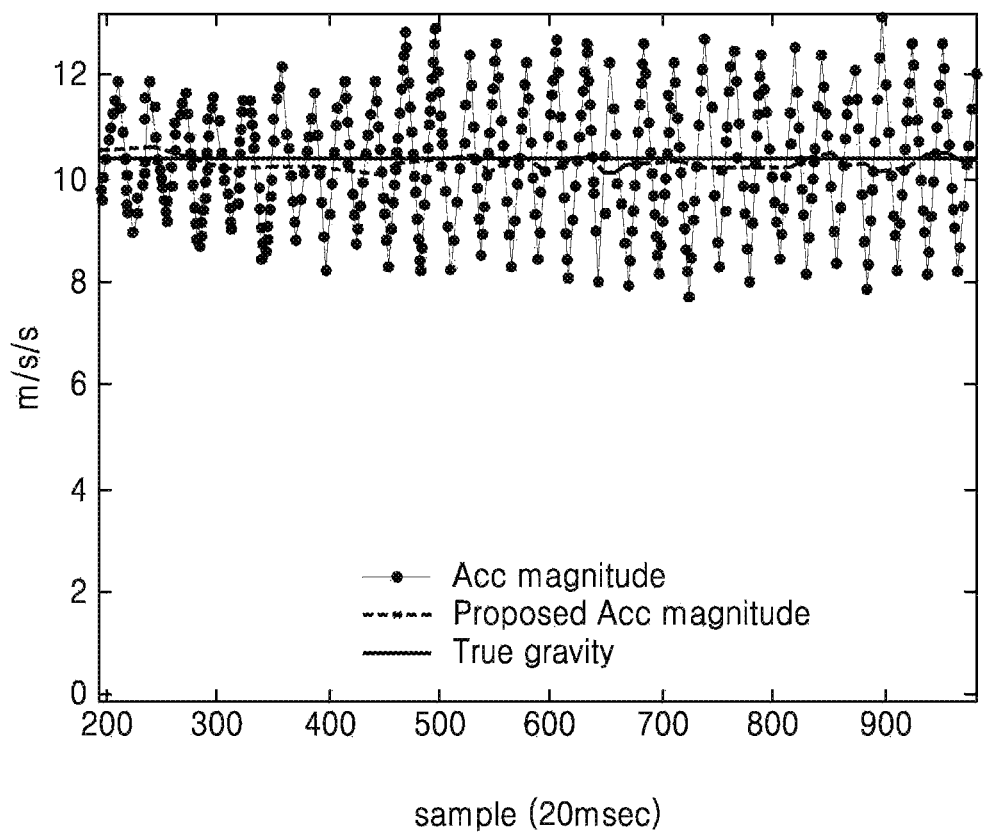
FIG. 17 is a graph showing gravitational acceleration in a coordinate system before coordinate transformation, according to an exemplary embodiment.

FIG. 17 is a diagram showing a magnitude of three-axis acceleration, a magnitude of three-axis acceleration when the gravitational acceleration is removed, and a true value of gravitational acceleration in a body frame.

The magnitude of three-axis acceleration may have a great error similar to the sine wave based on the true value of gravitational acceleration because of vertical acceleration and horizontal acceleration that are generated as the user moves. However, the proposed method effectively removes the vertical acceleration and the horizontal acceleration with respect to a proceeding direction of the user, and thus extracts a value that is almost the same as the true value of gravitational acceleration. This corresponds to a theoretical conclusion that the method proposed in the exemplary embodiments provides an optimum solution via mathematical proof. When a roll angle and a pitch angle are used without removing acceleration in which vertical and horizontal acceleration of the user in the body frame, large position error may be generated. This position error may cause a large coordinate transformation error, and thus lead to errors in x-axis acceleration and y-axis acceleration in the local frame, which thus generates error in the inclination angle of the device with respect to the proceeding direction of the user.

The x-axis and y-axis acceleration in the local frame may be obtained by extracting gravitational acceleration from the acceleration component of the body frame according to the above-described process, calculating a roll angle and a pitch angle of the device, substituting the calculated roll angle and the pitch angle to the coordinate transformation matrix of EQN. (4), and performing coordinate transformation. The method of obtaining x-axis and y-axis acceleration in the local frame indicates that acceleration of the local frame is a 3×1 acceleration vector that is calculated by multiplying a 3×1 acceleration vector '[x-axis acceleration, y-axis acceleration, z-axis acceleration]$^T$' of the body frame at a right side of the 3×3 coordinate transformation matrix C of EQN. (4). Therefore, first two rows of the 3×1 acceleration vector of the local frame is the x-axis and y-axis acceleration of the local frame.

The inclination angle of the device on a horizontal axis with respect to the proceeding direction of the user may be obtained based the x-axis and y-axis acceleration of the local frame. However, angle error may be generated due to sensor noise. The present disclosure suggests band-pass filtering to remove the noise.

Figure 18:
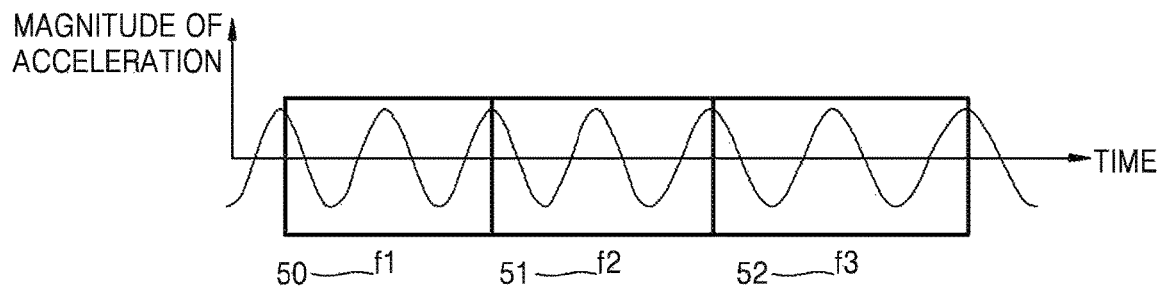
FIG. 18 is a diagram for describing a method of removing noise via filtering, according to an exemplary embodiment.
Figure 18:
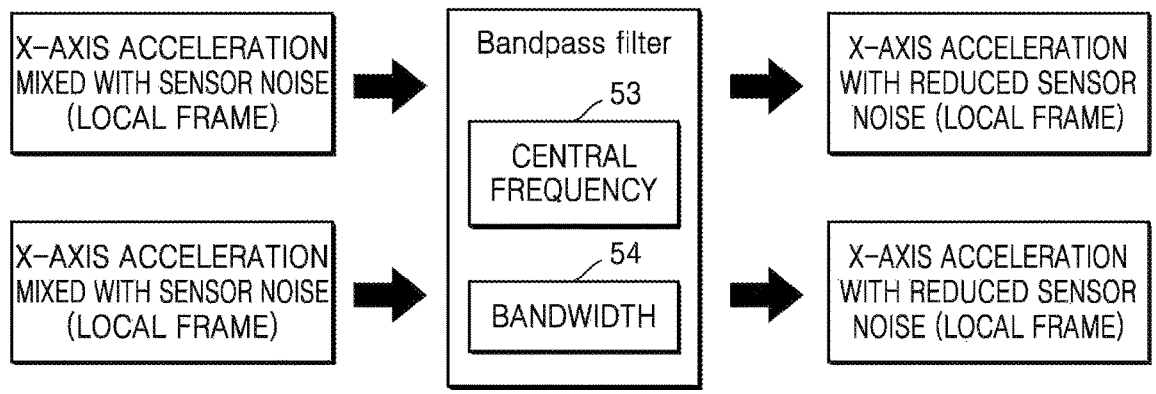

FIG. 18 is a diagram of removing noise of x-axis and y-axis acceleration in the local frame.

In FIG. 18, time points 50, 51, and 52 show processes of adaptively estimating, over time, a frequency of a magnitude of acceleration obtained from the body frame. The frequency may be estimated by using one cycle of steps or N cycles of steps. The frequency is used as a central frequency 53 of a band-pass filter, and the central frequency 53 may be configured to change according to step frequency of the user along a time axis. A bandwidth 54 of the band-pass filter is also a valuable parameter and may be determined by tuning. By performing band-pass filtering on the x-axis and y-axis acceleration in the local frame, acceleration with reduced sensor noise may be obtained.

Figure 19:
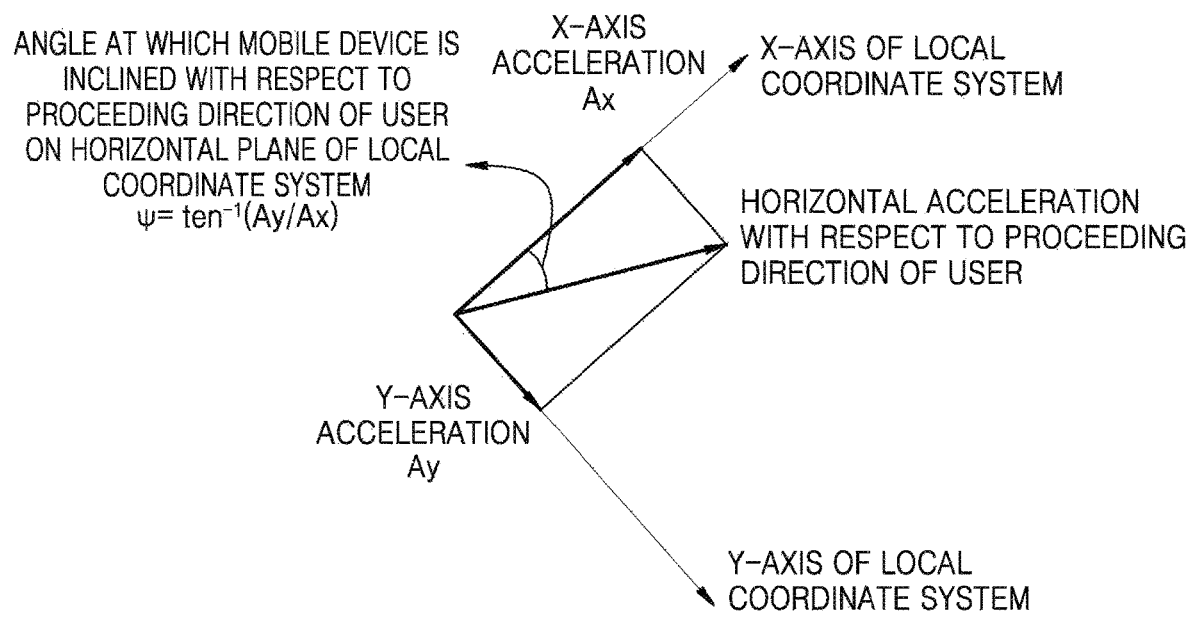
FIG. 19 is a diagram of an inclination angle of a device, according to an exemplary embodiment.

FIG. 19 is a diagram of an inclination angle of a device, according to an exemplary embodiment.

The device may not be located in the same direction as a moving (proceeding) direction of the user, and may be located with an inclination (rotation) angle. As shown in FIG. 19, the proceeding direction of the according to an exemplary embodiment may form an angle with an x-axis and a y-axis of the local frame. Ax denotes acceleration with respect to the x-axis that is band-pass filtered, and Ay denotes acceleration with respect to the y-axis that is band-pass filtered. In this case, the inclination angle of the device with respect to the proceeding direction of the user on the x-axis and the y-axis horizontal planes of the local frame is as shown below in EQN. (17).

$$\text{Inclination angle} = \Psi = \tan^{-1}\left(\frac{Ay}{Ax}\right) \quad \text{EQN. (17)}$$

As in EQN. (17), the estimated inclination angle of the device may be applied to various applications in the device.

Figure 20A:
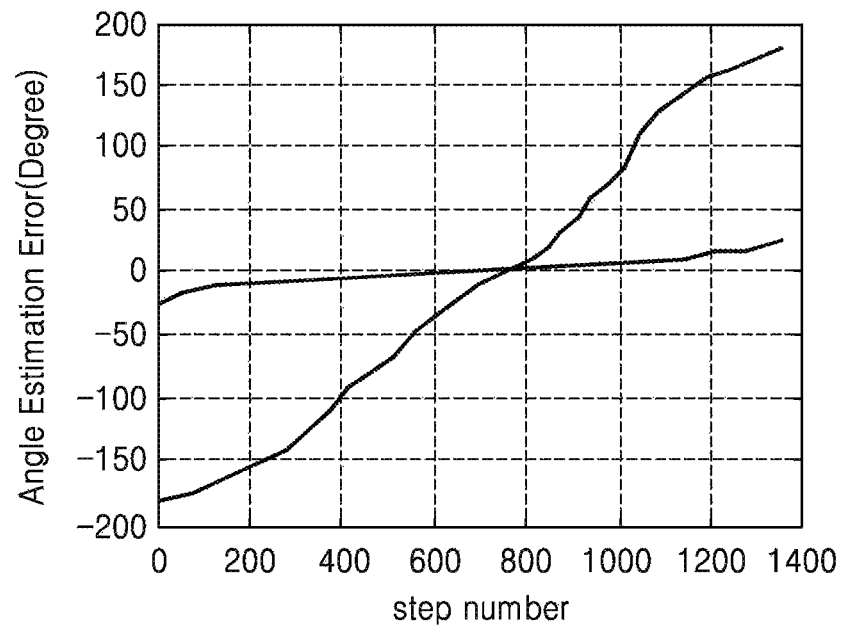
FIG. 20A and FIG. 20B show graphs of inclination angle estimation errors of a device, according to an exemplary embodiment.
Figure 20B:
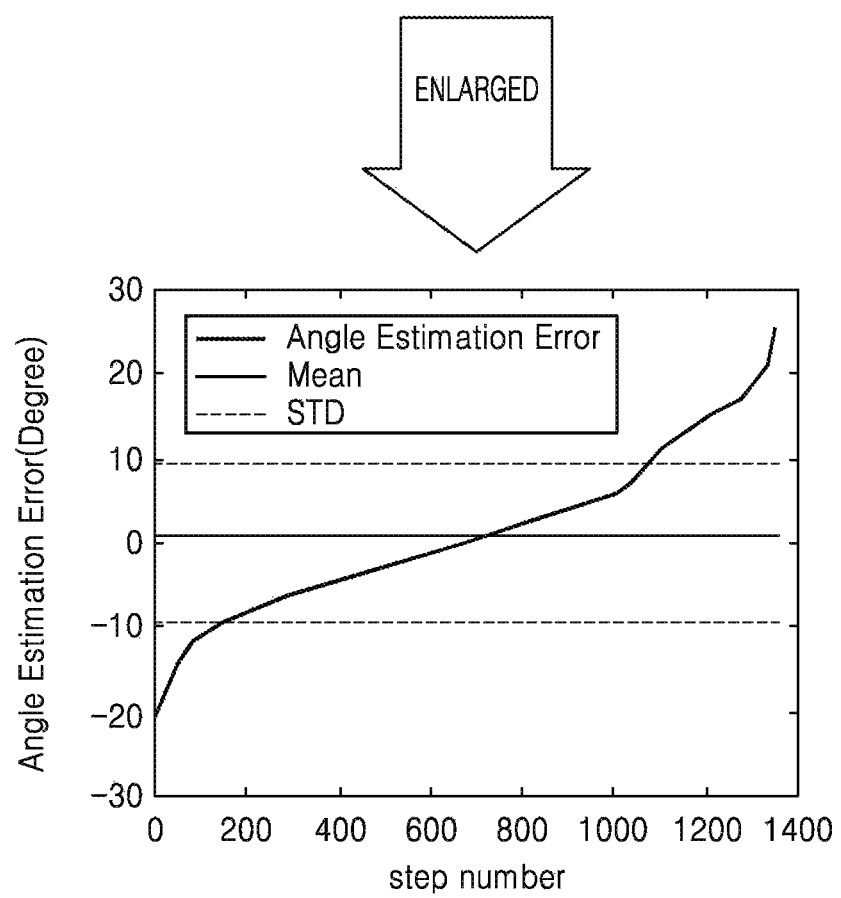

FIG. 20A and FIG. 20B show graphs of large to small estimation errors in the inclination angle of the device with respect to the proceeding direction of the user on a horizontal plane perpendicular to the gravitational acceleration formed by the x-axis and the y-axis of the of the local frame, obtained by performing experiments.

FIG. 20A shows the inclination angle of the device with respect to the proceeding direction of the user estimated by extracting the gravitational acceleration according to the above-described method, and an estimation result obtained by using the acceleration that includes the gravitational acceleration and the vertical and horizontal acceleration. FIG. 20B is an enlarged graph of an estimation error range of FIG. 20A. When the acceleration component other than the gravitational acceleration has not been properly removed as in FIG. 20A, position error of the device may be generated, and components of the horizontal acceleration may be distorted through inaccurate coordinate transformation, and thus, estimation error may increase. The estimation error is derived by using data obtained by performing experiments, not by simulations.

As shown in FIGS. 20A and 20B, eight angle differences from 0° to 315° with an interval of 45° has been tested 26 times. 1,354 steps were made during the tests, and error related to each step is shown in the order of smallest to greatest. The angle differences have an average of 1.2° and a standard deviation of 9.3°. This result is regarded as an actual test result of the theory on obtaining the inclination angle of the device with respect to the proceeding direction of the user by using only the accelerometer.

Figure 21:
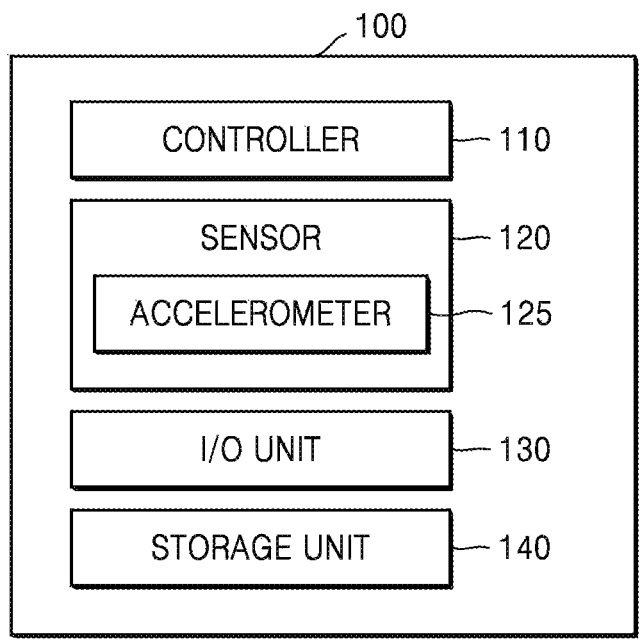
FIG. 21 is a schematic block diagram of a device, according to an exemplary embodiment.

FIG. 21 is a schematic block diagram of the device 100, according to an exemplary embodiment.

The device 100 according to an exemplary embodiment may include a controller 110, a sensor 120, an input/output (I/O) unit 130, and a storage unit 140. In addition, a display unit (not shown) displaying information of the device 100 and a communicator (not shown) performing communication with another device.

The sensor 120 may obtain various types of information from sources outside the device 100. The sensor 120 may include an accelerometer 125 that obtains acceleration of the device 100 and environment information such as temperature, humidity, position, and pressure.

The I/O unit 130 may include an input unit receiving information and commands from the sources outside the device 100, and an output unit transmitting information and commands processed in the device 100 to external sources.

The storage unit 140 may store the information processed in the device 100 and the information received from the sources outside the device 100.

The device 100 according to an exemplary embodiment may be a smartphone that includes an operating system (OS), and capable of performing Internet connection and executing various programs. The smartphone may be a digital mobile device including an OS and communication functions so that content may be used in a convenient user environment (user interface/user experience). Alternatively, the device 100 may include a multimedia player or a personal computer.

The controller 110 according to an exemplary embodiment may process acceleration information sensed by the device 100 by using EQNS. (1) through (17). The controller 110 may process information that is input to the device 100 according to preset operations.

The controller 110 may transform coordinates of the obtained acceleration information, filter the acceleration information on the converted coordinates, and determine a rotation angle with respect to a proceeding direction of the device 100 by using gravitational acceleration information on the converted coordinates. In this case, the gravitational acceleration information may be derived by using information about time points when vertical and horizontal acceleration components with respect to the proceeding direction of the device 100 have maximum values, from among the acceleration information.

The controller 110 may transform the obtained acceleration information from coordinates on a coordinate system based on the device 100 into coordinates on a coordinate system based on the direction of gravity.

The controller 110 may filter the acceleration information after transforming the acceleration information into a frequency range. In this case, the filtering process may be band-pass filtering. For example, the controller 110 may band-pass filter on the acceleration information that is transformed into a frequency range based on a central frequency that is determined by using dynamics of the device 100.

The controller 110 may encode or decode data that is input via the I/O unit 130. The controller 110 provides a user interface based on the OS of the device 100. The user interface may correspond to user's usage patterns.

The display unit may display data that is processed by the device 100 in the user interface. Also, when an instruction for the device 100 is needed from the user, the display unit may display information on a screen to guide the user to input various instructions.

The communicator may transmit and receive data and commands from other devices. The communicator may include any type of well-known communication modules, such as an infrared communication module, a radio communication module, or an optical communication module. For example, an infrared communication module that supports the Infrared Data Association (IrDA) protocol may be used as the communicator. As another example, a communication module utilizing the 2.4 GHz frequency band or a communication module utilizing Bluetooth may be used as the communicator.

The sensor 120 according to an exemplary embodiment may sense features that may be measured in or outside the device 100. The sensor 120 may include the accelerometer 125 that may obtain movements of the device 100 in a 3D space as acceleration information.

The I/O unit 130 according to an exemplary embodiment may receive a command from an external source and output processed information. For example, when the device 100 is a smartphone, the I/O unit 130 may receive a key input or a touch input, and output processed information on a screen or via sound.

The input unit of the I/O unit 130 may include at least one of Universal Serial Bus (USB), Parallel Advanced Technology Attachment (PATA), Serial Advanced Technology Attachment (SATA), flash media, Ethernet, Wi-Fi, and Bluetooth as an interface for receiving data such as content displayed on the display unit. In some cases, the device 100 may receive data via an information storage unit (not shown) such as an optical disk drive or a hard disk drive.

The device 100 according to an exemplary embodiment may also include a camera unit (not shown) that includes an optical image sensor. Images that are received via the camera unit may be processed as a single piece of data.

The input unit may further include a temperature or humidity sensor. The input unit may not only include a temperature sensor for measuring temperature inside the device 100, but also a temperature sensor for measuring temperature outside the device 100. The humidity sensor for measuring humidity may also be included in the input unit.

Also, the input unit may be a touch screen having a layered structure of a touch panel and an image display panel. The touch panel may be, for example, a capacitive touch panel, a resistive touch panel, or an infrared touch panel. The image display panel may be, for example, a liquid crystal display panel or an organic light-emitting display panel. Since such touch panels are well-known in the art, detailed description of a structure of the touch panel will be omitted. The image display panel may display graphics of the user interface.

The storage unit 140 according to an exemplary embodiment may store information that is processed by the controller 110. Also, the storage unit 140 may store information sensed by the sensor 120 and information received from other devices. The storage unit 140 may classify such information as databases and store therein.

The exemplary embodiments can be written as computer programs and can be implemented in general-use digital computers that execute the programs using a computer-readable recording medium. Examples of the computer-readable recording medium include magnetic storage media (e.g., read-only memory (ROM), floppy disks, hard disks, etc.), optical recording media (e.g., CD-ROMs, or DVDs), etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of determining a rotation angle of a device with respect to a proceeding direction of the device, the method comprising:

obtaining, from an accelerometer of the device, acceleration information related to movements of the device;

transforming coordinates of the acceleration information of the device;

filtering the acceleration information on the transformed coordinates of the device;

determining gravitational acceleration of gravity information on the transformed coordinates;

determining the rotation angle of the device with respect to the proceeding direction of the device by using the gravitational acceleration of the gravity information on the transformed coordinates; and displaying information based on the determined rotation angle, wherein the determining gravitational acceleration comprises obtaining an average acceleration for time points previous to and following a first time point when a vertical magnitude of acceleration has a maximum value and an average of acceleration for time points previous to and following a second time point when the vertical magnitude of acceleration has a minimum value in a vertical acceleration component at the transformed coordinates of the device, wherein the vertical acceleration component by a user's movement is an acceleration component that is generated by a height difference that occurs as the user moves.

2. The method of claim 1, wherein a time point when the vertical acceleration component at the transformed coordinates of the device has the maximum value is the same as a time point when a magnitude of acceleration of the acceleration information obtained has a maximum value.

3. The method of claim 1, wherein a minimum value of the vertical acceleration component at the transformed coordinates is derived by using the information about the time point when the vertical acceleration component at the transformed coordinates has the maximum value.

4. The method of claim 1, wherein a horizontal acceleration component included in the acceleration information corresponds to acceleration information with respect to the proceeding direction of the device, and the vertical acceleration component is an acceleration component between the device and a horizontal plane.

5. The method of claim 1, wherein the transforming of the coordinates of the acceleration information comprises transforming the acceleration information from coordinates on a coordinate system based on the device into coordinates on a coordinate system based on a direction of gravity.

6. The method of claim 5, wherein the coordinate system based on the direction of gravity includes three axes that are perpendicular to one another, and a first axis from among the three axes is parallel to a gravitational acceleration direction.

7. The method of claim 6, wherein a second axis from among the three axes is defined by rotating an axis of the coordinate system based on the device at a roll angle, and a third axis from among the three axes is defined by rotating another axis of the coordinate system based on the device at a pitch angle.

8. The method of claim 1, wherein the vertical acceleration component and a horizontal acceleration component at the transformed coordinates change according to an identical cycle.

9. The method of claim 1, wherein the vertical acceleration component and a horizontal acceleration component at the transformed coordinates have a phase difference of 90°.

10. The method of claim 9, wherein the vertical acceleration component leads the horizontal acceleration component by 90°.

11. The method of claim 9, wherein the vertical acceleration component lags the horizontal acceleration component by 90°.

12. The method of claim 1, wherein the gravitational acceleration is derived by averaging a magnitude of the vertical acceleration component and a magnitude of a horizontal acceleration component at the transformed coordinates of the device with respect to a plurality of cycles.

13. The method of claim 1, wherein the filtering of the acceleration information comprises transforming the acceleration information into a frequency range.

14. The method of claim 13, wherein the filtering of the acceleration information comprises band-pass filtering the acceleration information.

15. The method of claim 14, wherein the band-pass filtering comprises filtering the acceleration information that is transformed into the frequency range, based on a central frequency that is determined by using dynamics of the device.

16. The method of claim 15, wherein the dynamics of the device are obtained according to a position of a user of the device walking in the proceeding direction.

17. A device configured to determine a rotation angle of the device with respect to a proceeding direction of the device, the device comprising:

an accelerometer configured to obtain acceleration information related to movements of the device;

a storage unit configured to store the acceleration information; and a controller configured to transform coordinates of the acceleration information, filter the acceleration information at the transformed coordinates, determine gravitational acceleration of gravity information on the transformed coordinates, determine the rotation angle of the device with respect to the proceeding direction of the device by using the gravitational acceleration of the gravity information at the transformed coordinates, and display information based on the determined rotation angle, wherein the controller is configured to determine the gravitational acceleration comprising obtaining an average of acceleration for time points previous to and following a first time point when a vertical magnitude of acceleration has a maximum value and an average of acceleration for time points previous to and following a second time point when the vertical magnitude of acceleration has a minimum value in a vertical acceleration component at the transformed coordinates of the device, wherein the vertical acceleration component by a user's movement is an acceleration component that is generated by a height difference that occurs as the user moves.

18. The device of claim 17, wherein a time point when the vertical acceleration component at the coordinates transformed by the controller of the device has the maximum value is the same as a time point when a magnitude of acceleration of the obtained acceleration information has a maximum value.

19. The device of claim 17, wherein the controller derives a minimum value of the vertical acceleration component at the transformed coordinates by using the information about the time point when the vertical acceleration component at the transformed coordinates has the maximum value.

20. The device of claim 17, wherein a horizontal acceleration component included in the acceleration information corresponds to acceleration information with respect to the proceeding direction of the device, and the vertical acceleration component is an acceleration component between the device and a horizontal plane.

21. The device of claim 17, wherein the controller transforms the acceleration information from coordinates in a coordinate system based on the device into coordinates in a coordinate system based on a direction of gravity.

22. The device of claim 21, wherein the coordinate system based on the direction of gravity includes three axes that are perpendicular to one another, and a first axis from among the three axes is parallel to a gravitational acceleration direction.

23. The device of claim 22, wherein a second axis from among the three axes is defined by rotating an axis of the coordinate system based on the device at a roll angle, and a third axis from among the three axes is defined by rotating another axis of the coordinate system based on the device at a pitch angle.

24. The device of claim 17, wherein the vertical acceleration component and a horizontal acceleration component at the coordinates transformed by the controller change according to an identical cycle.

25. The device of claim 17, wherein the vertical acceleration component and a horizontal acceleration component at the transformed coordinates have a phase difference of 90°.

26. The device of claim 25, wherein the vertical acceleration component leads the horizontal acceleration component by 90°.

27. The device of claim 25, wherein the vertical acceleration component lags the horizontal acceleration component by 90°.

28. The device of claim 17, wherein the gravitational acceleration information is derived by averaging a magnitude of the vertical acceleration component and a magnitude of a horizontal acceleration component at the coordinates transformed by the controller of the device with respect to a plurality of cycles.

29. The device of claim 17, wherein the controller performs filtering after transforming the acceleration information into a frequency range.

30. The device of claim 29, wherein the controller band-pass filters the acceleration information.

31. The device of claim 30, wherein the controller band-pass filters the acceleration information that is transformed into the frequency range, based on a central frequency that is determined by using dynamics of the device.

32. The device of claim 31, wherein the dynamics of the device are obtained according to a position of a user of the device walking in the proceeding direction.

* * * * *